United States Patent
Faraji-Dana et al.

(10) Patent No.: US 11,092,486 B2
(45) Date of Patent: Aug. 17, 2021

(54) COMPACT FOLDED METASURFACE SPECTROMETER

(71) Applicant: CALIFORNIA INSTITUTE OF TECHNOLOGY, Pasadena, CA (US)

(72) Inventors: MohammadSadegh Faraji-Dana, Pasadena, CA (US); Ehsan Arbabi, Arcadia, CA (US); Amir Arbabi, Sunderland, CA (US); Andrei Faraon, La Canada Flintridge, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 308 days.

(21) Appl. No.: 16/213,810

(22) Filed: Dec. 7, 2018

(65) Prior Publication Data

US 2019/0178714 A1  Jun. 13, 2019

Related U.S. Application Data

(60) Provisional application No. 62/596,564, filed on Dec. 8, 2017.

(51) Int. Cl.
*G01J 3/02* (2006.01)
*G02B 5/18* (2006.01)

(52) U.S. Cl.
CPC .......... *G01J 3/0259* (2013.01); *G01J 3/0208* (2013.01); *G01J 3/0224* (2013.01); *G02B 5/1814* (2013.01); *G02B 5/1847* (2013.01); *G02B 5/1861* (2013.01)

(58) Field of Classification Search
CPC ...... G01J 3/0259; G01J 3/0208; G01J 3/0224; G01J 3/18; G01J 3/0243; G01J 3/0256; G02B 5/1861; G02B 5/1814; G02B 5/1847; G02B 5/284–285
See application file for complete search history.

(56) References Cited

U.S. PATENT DOCUMENTS

| | | | |
|---|---|---|---|
| 7,864,317 B2 | 1/2011 | Bockstaele et al. | |
| 8,390,806 B1 | 3/2013 | Subramanian | |
| 8,477,306 B2 | 7/2013 | Shibayama et al. | |
| 2017/0030773 A1 | 2/2017 | Han et al. | |
| 2018/0252857 A1 | 9/2018 | Glik et al. | |
| 2019/0033129 A1 | 1/2019 | Kim et al. | |
| 2019/0178714 A1 | 6/2019 | Faraji-Dana et al. | |
| 2019/0353522 A1* | 11/2019 | Scholtz | G01J 3/0254 |

(Continued)

OTHER PUBLICATIONS

Arbabi, A. et al. "Dielectric metasurfaces for complete control of phase and polarization with subwavelength spatial resolution and high transmission" *Nature Nanotechnology* 10, 937-943 (Nov. 2015). 8 pages.

(Continued)

*Primary Examiner* — Kimberly N. Kakalec
(74) *Attorney, Agent, or Firm* — Steinfl + Bruno, LLP

(57) ABSTRACT

Compact optical devices such as spectrometers are realized with metasurfaces within a dielectric medium confined by reflective surfaces. The metasurfaces control the phase profiles of the reflected electromagnetic waves within the device. In a compact spectrometer, the metasurfaces within the device separate the electromagnetic waves in different wavelengths. The metasurfaces are designed according to their phase profile by varying the size of the array of scatterers.

11 Claims, 29 Drawing Sheets

(56) References Cited

U.S. PATENT DOCUMENTS

2020/0072668 A1* 3/2020 Han .................... G01J 3/027
2020/0348176 A1 11/2020 Faraji-Dana et al.

OTHER PUBLICATIONS

Arbabi, A. et al. "Planar metasurface retroreflector" *Nature Photonics* 11, 415-420, (Jul. 2017). 7 pages.
Arbabi, E., et al. "Multiwavelength polarization-insensitive lenses based on dielectric metasurfaces with meta-molecules", *Optica*3, 628-633 (Jun. 2016).6 pages.
Backlund, M.P. et al. "Removing Orientation-Induced Localization Biases in Single-Molecule Microscopy Using a Broadband Metasurface Mask" *Nature Photonics* 10, 459-462 (Nov. 2016). 14 pages.
Kamali, S. M. et al. "Decoupling optical function and geometrical form using conformal flexible dielectric metasurfaces" *Nature Communications* 7, 11618, (May 2016), 7 pages.
Paniagua-Dominguez, R. et al. "A Metalens with Near-Unity Numerical Aperture" *Nano Letters* 18, 2124-2132, (2018). 9 pages.
Aieta, F. et al. "Aberration-free ultrathin flat lenses and axicons at telecom wavelengths based on plasmonic metasurfaces" *Nano Letters* 12, 4932-4936 (Aug. 2012). 5 pages.
Arbabi, A. et al. "Controlling the phase front of optical fiber beams using high contrast metastructures" in 2014*Conference of Lasers and Electro-optics* (CLEO), (2014). 2 pages.
Arbabi, A. et al., "Fundamental limits of ultrathin metasurfaces" *Scientific Reports* 7, 43722 (Mar. 2017). 9 pages.
Arbabi, A. et al. "Miniature optical planar camera based on a wide-angle metasurface doublet corrected for monochromatic aberrations" *Nature Communications* 7, 13682 (Nov. 2016). 9 pages.
Arbabi, E. et al., "Controlling the sign of chromatic dispersion in diffractive optics with dielectric metasurfaces" *Optica* 4, 625-632 (Jun. 2017), 8 pages.
Azana, J. et al. "Real-time optical spectrum analysis based on the time-space duality in chirped fiber gratings" *IEEE Journal of Quantum Electronics* 36, 517-526 (May 2000). 10 pages.
Bekele, D. et al. "Polarization-independent wideband high-index-contrast grating mirror" *IEEE Photonics Technology Letters* 27, 1733-1736 (Aug. 2015). 4 pages.
Chang-Hasnain, C. J. "High-contrast gratings for integrated optoelectronics." *Advances in Optics and Photonics* 4, 379-440 (2012).
Chong, K. E. et al. "Polarization-independent silicon metadevices for efficient optical wavefront control" *Nano Letters* 15, 5369-5374 (Jul. 2015). 6 pages.
Chu, C. H. et al. "Active dielectric metasurface based on phase-change medium" *Laser & Photonics Reviews* 10, 986-994 (2016). 9 pages.
Faklis, D. et al. "Spectral properties of multiorder diffractive lenses" *Applied Optics* 34, 2462-2468 (May 1995). 7 pages.
Fattal, D. et al. "Flat dielectric grating reflectors with focusing abilities" *Nature Photonics* 4, 466-470 (May 2010). 5 pages.
Ferrari, M. et al. "A brief review on the history of human functional near-infrared spectroscopy (fNIRS) development and fields of application" *Neuroimage* 63, 921-935 (Mar. 2012). 15 pages.
Gan, X. et al. "A high-resolution spectrometer based on a compact planar two dimensional photonic crystal cavity array" *Applied Physics Letters* 100, 231104 (Jan. 2012). 5 pages.
Grabarnik, S. et al. "High-resolution microspectrometer with an aberration-correcting planar grating" *Applied Optics* 47, 6442-6447 (Dec. 2008). 6 pages.
Horie, Y. et al. "Visible wavelength color filters using dielectric subwavelength gratings for backside-illuminated CMOS image sensor technologies" *Nano Letters* 17, 3159-3164 (Apr. 2017). 6 pages.
Jahani, S. "All-dielectric metamaterials" *Nature Nanotechnology* 11, 23-36 (Jan. 2016). 14 pages.
Jang, M. et al. "Wavefront shaping with disorder-engineered metasurfaces" *Nature Photonics* 12, 84-91, (Feb. 2018). 8 pages.
Kamali, S. et al., "Highly tunable elastic dielectric metasurface lenses" *Laser & Photonics Reviews* 10, 1002-1008 (2016). 17 pages.
Kamali, S. M. et al. "Angle-multiplexed metasurfaces: encoding independent wavefronts in a single metasurface under different illumination angles" *Physical Review X* 7, 041056, (2017). 9 pages.
Khorasaninejad, M. et al. "Super-dispersive off-axis meta-lenses for compact high resolution spectroscopy" *Nano Letters* 16, 3732-3737 (Apr. 2016). 6 pages.
Kildishev, A. et al. "Planar photonics with metasurfaces." *Science* 339,1232009 (Mar. 2013). 8 pages.
Lalanne, P. et al. "Metalenses at visible wavelengths: past, present, perspectives" *Laser & Photonics Reviews* 11 (2017). 17 pages.
Lin, D. et al. "Dielectric gradient metasurface optical elements" *Science* 345, 298-302 (Jul. 2014). 6 pages.
Liu, V. et al. "S4: A free electromagnetic solver for layered periodic structures" *Computer Physics Communications* 183, 2233-2244, (May 2012). 11 pages.
Miyamoto, K. "On the design of optical systems with an aspheric surface" *Journal of the Optical Society of America* 51, 21-22 (Jan. 1961). 2 pages.
Moitra, P. et al. "Experimental demonstration of a broadband all-dielectric metamaterial perfect reflector" *Applied Physics Letters* 104, 171102 (Apr. 2014). 6 pages.
Momeni, B. et al. "Integrated photonic crystal spectrometers for sensing applications" *Optics Communications* 282, 3168-3171 (2009). 4 pages.
Nitkowski, A. et al. "Cavity-enhanced on-chip absorption spectroscopy using microring resonators" *Optics Express* 16, 11930-11936 (2008). 7 pages.
Pervez, N. K. et al. "Photonic crystal spectrometer" *Optics Express* 18, 8277-8285 (Apr. 2010). 9 pages.
Pors, A. et al., "Random-phase metasurfaces at optical wavelengths" *Scientific Reports* 6, 28448, (Jun. 2016). 10 pages.
Redding, B. et al. "Compact spectrometer based on a disordered photonic chip" *Nature Photonics* 7, 746-751 (Sep. 2013). 6 pages.
Sell, D. et al. "Large-angle, multifunctional metagratings based on freeform multimode geometries" *Nano Letters* 17, 3752-3757 (May 2017), 6 pages.
Thomas, C. E. "Optical spectrum analysis of large space bandwidth signals" *Applied Optics* 5, 1782-1790 (Nov. 1966). 9 pages.
Wang, S.W. et al. "Concept of a high-resolution miniature spectrometer using an integrated filter array." *Optics Letters* 32, 632-634 (Mar. 2007). 3 pages.
Xia, Z. et al. "High resolution on-chip spectroscopy based on miniaturized microdonut resonators" *Optics Express* 19, 12356-12364, (Jun. 2011). 9 pages.
Yang, Y. et al. "Nonlinear fano-resonant dielectric metasurfaces" *Nano Letters* 15, 7388-7393 (Oct. 2015). 6 pages.
Yu, N. et al. "Flat optics with designer metasurfaces" *Nature materials* 13, 139-150, (Jan. 2014). 12 pages.
Zhan, A. et al. "Low-contrast dielectric metasurface optics" *ACS Photonics* 3, 209-214 (Feb. 2016). 6 pages.
Zhou, Z. et al. "Efficient silicon metasurfaces for visible light" *ACS Photonics*4, 544-551 (Jan. 2017). 8 pages.
Arbabi, A. et al. "Increasing efficiency of high-NA Metasurface lenses (Conference Presentation)" in SPIE OPTO, 101130K-101130K, International Society for Optics and Photonics. Apr. 2017. 2 pages (abstract only).
Afridi et al., "Electrically Driven Varifocal Silicon Metalens" ACS Photonics 2018, 5, 4497-4503. 7 pages . . . .
Arbabi, A. et al. "Increasing efficiency of high-NA nnetasurface lenses (conference presentation)" in SPIE OPTO, 101130K-101130K (International Society for Optics and Photonics,2017).
Arce et al., "Compressive Coded Aperture Spectral Imaging" IEEE Signal Processing Magazine. 2014. 11 pages . . . .
Boldrini et al., "Hyperspectral imaging: a review of best practice, performance and pitfalls for in-line and on-line applications" Journal of Near Infrared Spectroscopy. 20, 483-508 (2012).
Eismann et al., "Hyperspectral remote sensing" (SPIE, Bellingham, 2012).

(56) References Cited

OTHER PUBLICATIONS

ElMasry et al., "Principles of Hyperspectral Imaging Technology" Hyperspectral Imaging for Food Quality Analysis and Control. 2010. 42 pages . . . .
Faraji-Dana et al., "Compact folded metasurface spectrometer" Nature Communications, 2018, 9:4196. 8 pages . . . .
Fernandez et al., "Infrared spectroscopic imaging for histopathologic recognition". Nature biotechnology, vol. 23, No. 4. 2005. 6 pages . . . .
Gao et al., "Compact image slicing spectrometer (iss) for hyperspectral fluorescence microscopy" Opt. express 17, 122293-12308 (2009).
Gao et al., "Depth-resolved image mapping spectrometer (IMS) with structured illumination" Optics Express, vol. 19, No. 18. 2011. 14 pages . . . .
Gat et al., "Imaging spectroscopy using tunable filters: a review" Proceedings of Spie, Wavelet Applications VII. 2000.
Goetz et al., "Imaging spectrometry for earth remote sensing" Sci. 228, 1147-1153 (1985).
Gowen et al., "Hyperspectral imaging—an emerging process analytical tool for food quality and safety control" Trends in Food Science & Technology 18. 2007. 590-598.
Gupta et al., "Hyperspectral imager, from ultraviolet to visible, with KDP acousto-optic tunable filter" Applied Optics. vol. 43, No. 13. 2004.
Hagen et al., "Review of snapshotspectral imaging technologies". Optical Engineering. 52(9), Sep. 2013. 24 pages . . . .
Harvey et al, "High-throughputsnapshotspectral imaging in two dimensions" Biomedical Optics, 2003. 10 pages . . . .
Hsiao et al., "Fundamentals and Applications of Metasurfaces" Small Methods 2017, 20 pages . . . .
Hunter W. "Diffraction gratings and applications" Optics & Photonics News 8, 52-53 (1997). 2 pages.
International Search Report for International Application No. PCT/US2020/025013 filed on Mar. 26, 2020 on behalf of California Institute of Technology dated Jul. 15, 2020 4 pages.
Kamali et al., "A review of dielectric optical metasurfaces for wavefront control" Nanophotonics 2018; 7(6): 1041-1068. 28 pages . . . .
Kim et al., "Design and fabrication of a 900-1700 nm hyper-spectral imaging spectrometer" Optics Communications 283 (2010) 355-361. 7 pages . . . .
Kruk et al., "Functional Meta-Optics and Nanophotonics Governed by Mie Resonances" ACS Photonics, 2017.4, 2638-2649.
Kruk et al., "Transparent Dielectric Metasurfaces for Spatial Mode Multiplexing" Laser Photonics Rev. 2018, 12. 6 pages . . . .
Lalanne et al., "Blazed binary subwavelength gratings with efficiencies larger than those of conventional echelette gratings" Optics Letters., vol. 23, No. 14. 1998. 3 pages . . . .
Lewis et al., "Fourier Transform Spectroscopic Imaging Using an Infrared Focal-Plane Array Detector" Anal. Chem. 1995, 67, 3377-3381. 5 pages . . . .
Li Jia et al., "Broadband metasurfaces for independent control of reflected amplitude and phase". AIP Advances 6, 045024 (2016). 7 pages . . . .
Liang et al., "Advances in multispectral and hyperspectral imaging for archaelogy and art conservation" Appl. Phys. A 106, 309-323 (2012).
Lim et al., "Spatial scanning hyperspectral imaging probe for bio-imaging applications" Rev. Sci Instrum. 87. 2016. 8 pages . . . .
Liu et al., "Broadband Metasurfaces with Simultaneous Control of Phase and Amplitude" Advanced Materials. 2014, 26, 5031-5036. 6 pages . . . .
Lu et al., "Medical hyperspectral imaging: a review" Journal of Biomedical Optics 19(1), 2014.
Mohammadsadegh F. et al., "Compact folded metasurface spectro meter" *Nature Communications*2018 pp. 1-8.
Morris et al., "Imaging spectrometers for fluorescence and raman microscopy: acuosto-optic and liquid crystal tunable filters", Society for Applied Spectroscopy. vol. 48, No. 7, 1994.
Mouroulis et al., "Design of pushbroom imaging spectrometers for optimum recovery of spectroscopic and spatial information" Applied Optics, vol. 39, No. 13. 2000. 12 pages.
Shaw et al., "Spectral Imaging for Remote Sensing" Lincoln Laboratory Journal, vol. 14, No. 1, 2003. 26 pages . . . .
Tack et al., "A compact, high-speed, and low-cost hyperspectral imager" Proceedings of Spie. 2012. 14 pages . . . .
Voloshinov et l., "Improvement in performance of a TeO2 acousto-optic imaging spectrometer" Journal of Optics A: Pure and Applied Optics 9. (2007) 341-347. 8 pages . . . .
Wagadarikar et al., "Single disperser design for coded aperture snapshot spectral imaging" Applied Optics. vol. 47, No. 10. 2008. 9 pages . . . .
Wang et al., "Grayscale transparent nnetasurface holograms" Optica, vol. 3, No. 2. 2016. 2 pages . . . .
Wang et al., "MEMS scanner enabled real-time depth sensitive hyperspectral imaging of biological tissue" Optics Express. 2010.
Written Opinion for International Application No. PCT/US2020/025013 filed on Mar. 26, 2020 on behalf of California Institute of Technology dated Jul. 15, 2020 8 pages.
Zhou et al., "Multilayer Noninteracting Dielectric Metasurfaces for Multiwavelength Metaoptics" Nano Letters, 2018, 7529-7537. 9 pages . . . .

\* cited by examiner

COMPACT FOLDED METASURFACE SPECTROMETER

CROSS REFERENCE TO RELATED APPLICATIONS

The present application claims priority to U.S. Provisional Patent Application No. 62/596,564, filed on Dec. 8, 2017, the disclosure of which is incorporated herein by reference in its entirety.

STATEMENT OF INTEREST

This invention was made with government support under Grant No. DE-SC0001293 awarded by the Department of Energy. The government has certain rights in the invention.

TECHNICAL FIELD

The present disclosure relates to metasurfaces. More particularly, it relates to the design and fabrication of a compact folded metasurface spectrometer.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
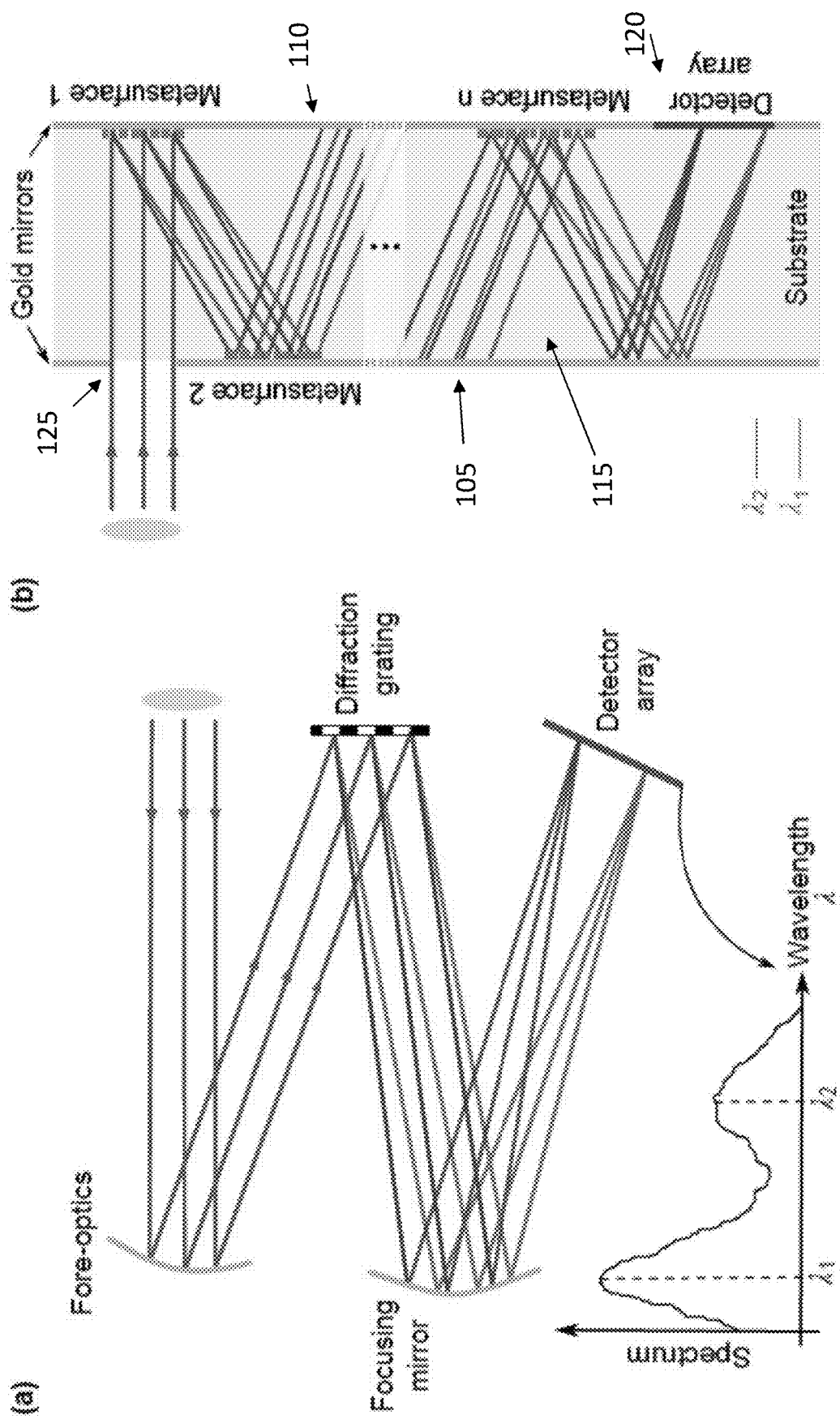
FIG. 1 illustrates a schematic of a metasurface spectrometer.

In a first aspect of the disclosure, a structure is described, the structure comprising: two reflective surfaces opposite to each other and configured to reflect electromagnetic waves; a dielectric medium between the two reflective surfaces, the dielectric medium being transparent to the reflected electromagnetic waves; at least one first opening on one of the two reflective surfaces and configured to input electromagnetic waves; at least one second opening on one of the two reflective surfaces and configured to output the reflected electromagnetic waves; and a plurality of metasurfaces between the two reflective surfaces, wherein: each metasurface of the plurality of metasurfaces comprises an array of scatterers, each metasurface of the plurality of metasurfaces is configured to control a phase or a polarization of the reflected electromagnetic waves.

In a second aspect of the disclosure, a method is described, the method comprising: calculating a phase profile for each metasurface of a plurality of metasurfaces, each metasurface of the plurality of metasurfaces comprising an array of scatterers; calculating lateral dimensions of each array of scatterers for each metasurface of the plurality of metasurfaces based on the phase profile of the corresponding metasurface of the plurality of metasurfaces; and fabricating a structure comprising: two reflective surfaces opposite to each other and configured to reflect electromagnetic waves; a dielectric medium between the two reflective surfaces, the dielectric medium being transparent to the reflected electromagnetic waves; at least one first opening on one of the two reflective surfaces and configured to input electromagnetic waves; at least one second opening on one of the two reflective surfaces and configured to output the reflected electromagnetic waves; and the plurality of metasurfaces between the two reflective surfaces.

DETAILED DESCRIPTION

The present disclosure describes an optical design based on metasurfaces, in particular with reference to a folded optics architecture where light is confined between reflective surfaces, and the wavefront is controlled at the reflective interfaces. The present disclosure describes the concept of folded metasurface optics by demonstrating a compact spectrometer made from a 1-mm-thick glass slab with a volume of 7 cubic millimeters. The exemplary spectrometer has a resolution of ~1.2 nm, resolving more than 80 spectral points from 760 to 860 nm. The device is composed of three reflective dielectric metasurfaces, fabricated in a single lithographic step on one side of a substrate, which simultaneously acts as the propagation volume for light. The dimensions of the spectrometer are only used as an example, and other dimensions may also be used. Further, the folded metasystem design can be applied to many different optical systems, such as optical signal processors, interferometers, hyperspectral imagers and computational optical systems, significantly reducing their sizes and increasing their mechanical robustness and potential for integration.

Optical spectrometry is a key technique in various areas of science and technology with a wide range of applications. This has resulted in a large demand for spectrometers and/or spectrum analyzers with different properties (e.g., operation bandwidth, resolution, size, etc.) required for different applications. Conventional optical spectrometers are composed of a dispersive element, such as a prism or a diffraction gating, that deflects different wavelengths of light by different angles, followed by focusing elements that focus light incoming from different angles to different points (or lines). As schematically shown in FIG. 1 panel a, the intensity at different wavelengths can then be measured using an array of detectors. Diffraction gratings have typically larger dispersive powers than transparent materials, and therefore diffractive spectrometers generally have better resolutions. The combination of several free space optical elements (the grating, focusing mirrors, etc.) and the free space propagation volume result in bulky spectrometers. In recent years, there has been an increased interest in high-performance compact spectrometers that can be easily integrated into consumer electronics for various medical and technological applications such as medical diagnosis, material characterization, quality control, etc. As a result, various schemes and structures have been investigated for realization of such spectrometers. For example, one class of miniaturized spectrometers integrate a series of band-pass filters with different center wavelengths on an array of photodetectors. Although these devices are compact, and compatible with standard microfabrication techniques, they have resolutions limited by filter quality factors that are currently achievable. These devices also have low sensitivities caused by the filtering operation that rejects a large portion of the input power. Spectrometers based on planar on-chip integrated photonics provide another solution with high spectral resolution. However, the loss associated with on-chip coupling of the input light and the reduced throughput because of the single-mode operation are still major challenges for widespread adoption in many applications.

Another type of compact spectrometers are conceptually similar to the conventional tabletop spectrometers, however, they use micro-optical elements to reduce size and mass. Due to the inferior quality and limited control achievable by micro-optical elements as well as the shorter optical path lengths, these devices usually have lower spectral resolutions. Higher resolution has been achieved by using aberration-correcting planar gratings, however an external spherical mirror makes the device bulky.

Dielectric metasurfaces, a new category of diffractive optical elements with enhanced functionalities, have attracted a great deal of interest in recent years. Overcoming many of the material and fundamental limitations of plasmonic metasurfaces, dielectric metasurfaces have proven capable of implementing several conventional, as well as new, optical devices with high efficiencies. These dielectric metasurfaces enable control of phase with subwavelength resolution and high gradients, and simultaneous control of phase and polarization. A key feature of metasurfaces is their compatibility with micro and nano-fabrication techniques, which allows for integration of multiple metasurfaces for realizing complex optical metasystems. Such metasystems allow for significantly improving optical properties of metasurfaces through aberration correction (such as lenses with diffraction limited operation over wide field of view), or functionalities fundamentally unachievable with local single-layer metasurfaces such as retroreflection.

FIG. 1 illustrates schematics of a conventional (panel a) and folded metasurface (panel b) spectrometers. Panel a shows a schematic illustration of a typical diffractive spectrometer. The main components are comprised of the fore-optics section, diffraction grating, focusing lenses and detector array. Panel b shows a folded compact spectrometer. All the dispersive and focusing optics can be implemented as reflective metasurfaces on the two sides (105,110) of a single transparent substrate. Mirrors on both sides confine and direct light to propagate inside the substrate, and the detector (120) can be placed directly at the output aperture of the device. If required, transmissive metasurfaces can also be added to the input (125) and output apertures to perform optical functions. Although the schematic of FIG. 1 includes metasurfaces on both sides, other exemplary devices discussed in the present disclosure are designed to have metasurfaces only on one side to simplify their fabrication.

As described in the present disclosure, folded optical metasystems comprise multiple metasurfaces which are integrated on a single substrate. The substrate gives mechanical support to the metasurfaces, and is also used as the propagation space for the light, as visible in FIG. 1, panel b. The present disclosure experimentally demonstrates a compact folded optics device for spectroscopy with a 1-mm thickness (~7-mm$^3$ volume) that provides a ~1.2-nm resolution over a 100-nm bandwidth (more than 80 points over a ~12% bandwidth) in the near infrared. Multiple reflective metasurfaces can be designed and fabricated on the same transparent substrate to disperse and focus light to different points on a plane parallel to the substrate. The configuration of FIG. 1 panel b can allow for the integration of the detector array on top of the folded spectrometer, resulting in a compact monolithic device. Recently it was demonstrated that an off-axis metasurface lens (i.e., a lens with an integrated blazed grating phase profile) can disperse and focus different wavelengths to different points. However, there are fundamental and practical limitations for such elements that significantly limit their application as a spectrometer. This is the reason why other types of diffractive optical elements, such as holographic optical elements and kinoforms, that can essentially perform a similar function have not been used for this application before.

Fundamentally, the chromatic dispersion and angular response correlation of diffractive optical elements and metasurfaces limit the bandwidth and angular dispersion range where the device can provide tight aberration-free focusing. This in turn limits the achievable resolution and bandwidth of the device. Moreover, the chromatic dispersion results in a focal plane almost perpendicular to the metasurface, which will then require the photodetector array to be placed almost normal to the metasurface plane. In addition to the distance for the propagation of dispersed light, this normal placement undermines the compactness of the device. Therefore, these devices have several disadvantages compared to those of the present disclosure.

Figure 2:
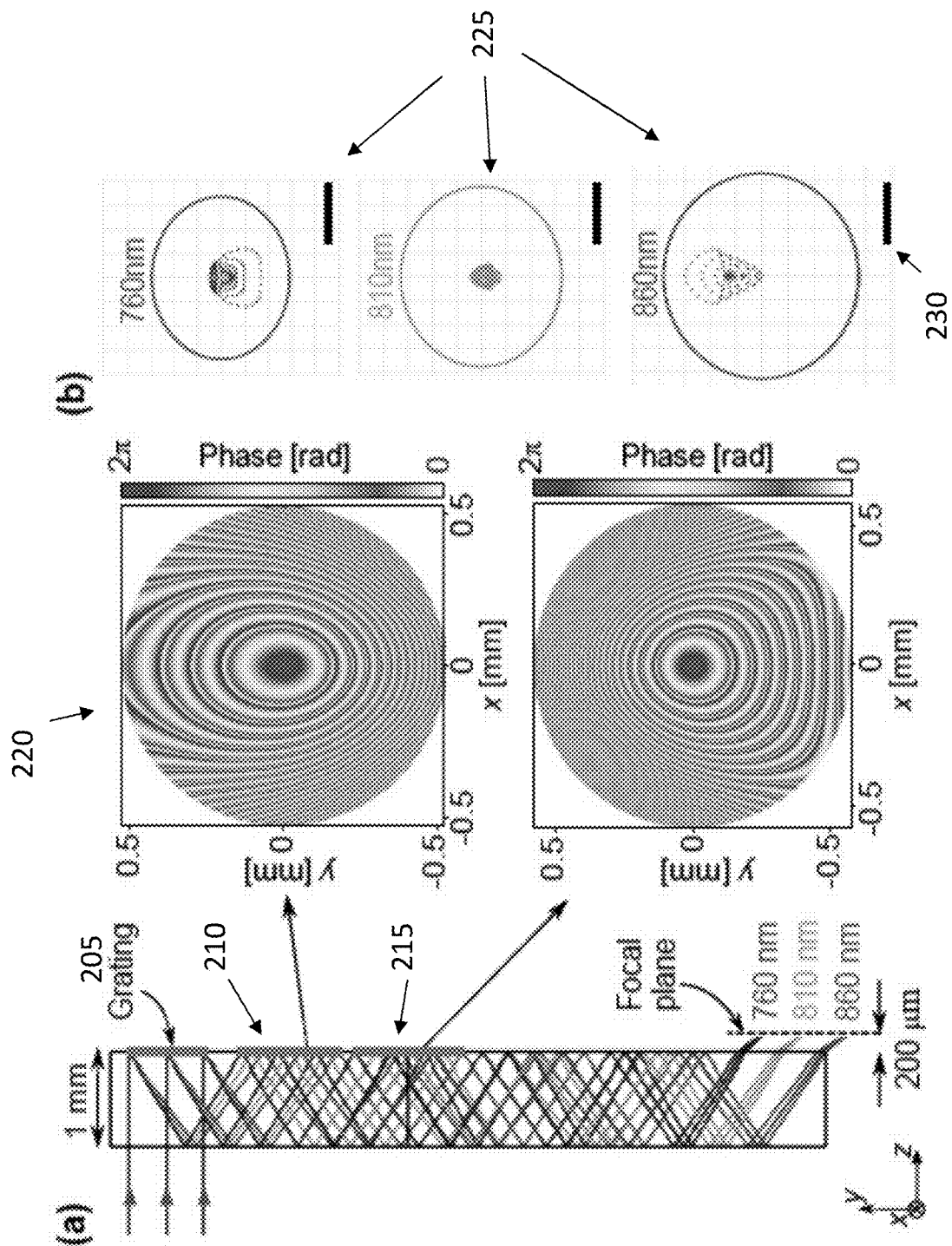
FIGS. 2-3 illustrate ray-optics design and simulation results of the folded spectrometer.

FIG. 2 panel a shows the ray tracing simulations of the designed exemplary spectrometer. The device consists of three metasurfaces (205,210,215), all patterned on one side of a 1-mm-thick fused silica substrate. The first metasurface (205) is a periodic blazed grating with a period of 1 that disperses different wavelengths of a collimated input light to different angles, centered around 33.9° at 810 nm. The second (210) and third (215) metasurfaces focus light coming from different angles (corresponding to various input wavelengths) to different points on the focal plane. A metasurface doublet is capable of correcting monochromatic aberrations to achieve near-diffraction-limited focusing over a wide field of view.

The second and third metasurfaces of FIG. 2 essentially work similar to the mentioned doublet, with the difference of working off axis and being designed in a folded configuration, so that the focal plane for our desired bandwidth is parallel to the substrate. To simplify the device characterization, the focal plane was designed to be located 200 outside the substrate. The asymmetric design of the focusing metasurfaces in an off-axis doublet configuration, allows for the focal plane to be parallel to the substrate. This renders the integration of the spectrometer and the detector array much simpler, results in a more compact and mechanically robust device, and allows for direct integration into consumer electronic products like smartphones.

The optimized phase profiles for the two surfaces are shown in FIG. 2 panel a (220). Simulated spot diagrams of the spectrometer are plotted in FIG. 2 panel b for three wavelengths at the center, and at the two ends of the bandwidth, showing negligible geometric aberrations. The spot diagrams are plotted only at three wavelengths, but the small effect of optical aberrations was confirmed for all wavelengths in the 760 nm-860 nm bandwidth. As a result, the spectral resolution of the device can be calculated using the diffraction limited Airy radius and the lateral displacement of the focus by changing the wavelength. The calculated resolution is plotted in FIG. 3 panel c, showing a theoretical value of better than 1.1 nm across the band. Point spread functions (PSFs) calculated for input beams containing two wavelengths 1.1 nm apart, and centered at 760 nm, 810 nm, and 860 nm are plotted in FIG. 3 panel d, showing two resolvable peaks.

Figure 4:
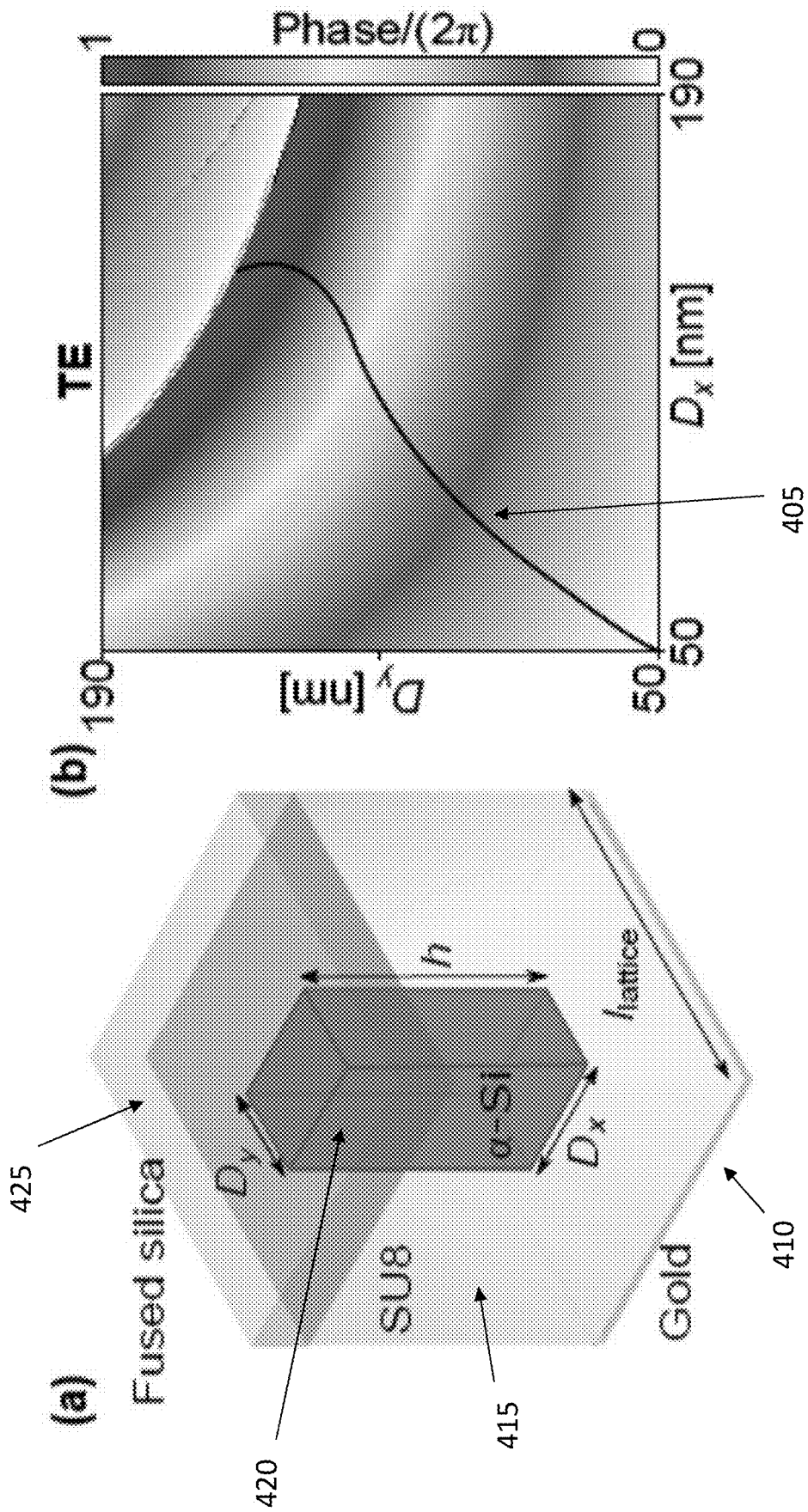
FIGS. 4-5 illustrate metasurface structure and design graphs.
Figure 5:
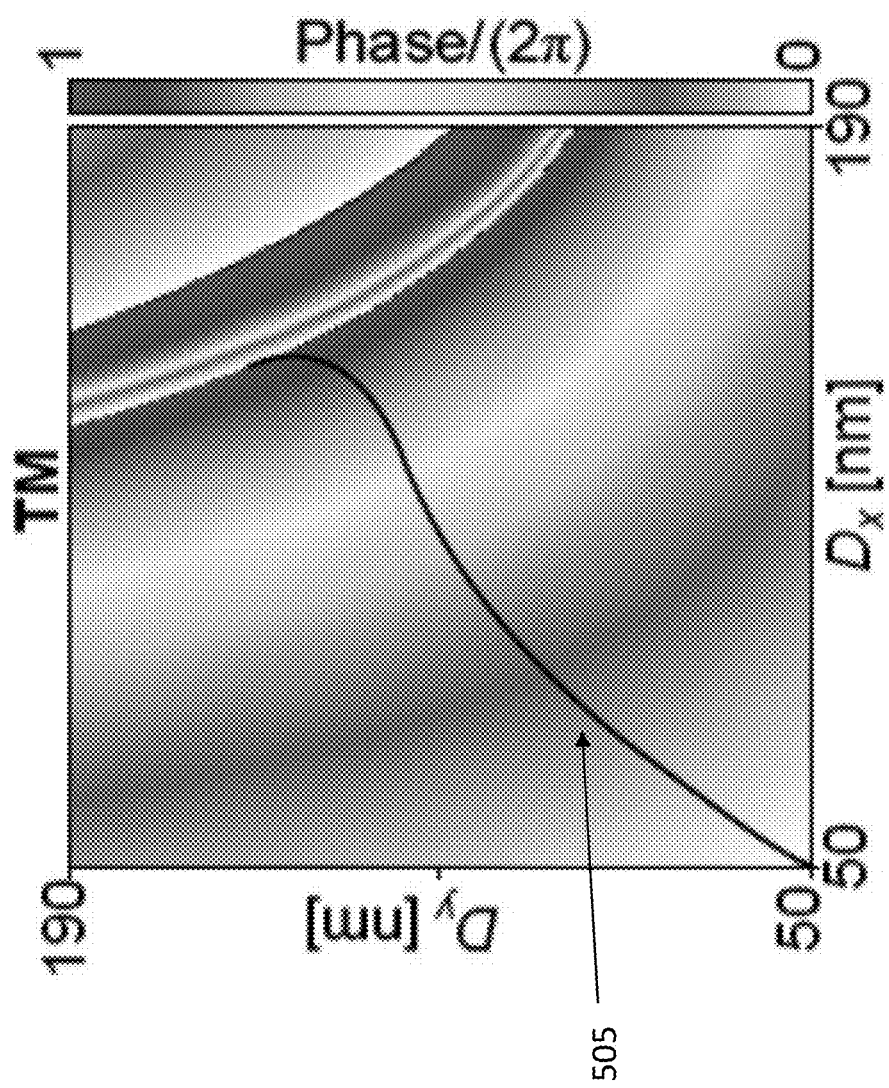

To implement the reflective metasurfaces, it is possible to use a structure comprising reflective elements. Each of the meta-atoms, shown schematically in FIG. 4 panel a, consists of an α-Si nano-post with a rectangular cross section, capped by a 2-micrometer thick SU-8 layer and backed by a gold mirror. The post height and lattice constant were chosen to be 395 nm and 246 nm, respectively, to achieve full $2\pi$ phase coverage while minimizing variation of the reflection phase derivative across the band. Minimizing the phase derivative variation will mitigate the reduction of device efficiency over the bandwidth of interest by decreasing the wavelength dependence of the phase profiles. In addition, since the two focusing metasurfaces are working under an oblique illumination (θ~33.9°), the nano-posts were chosen to have a rectangular cross-section to minimize the difference in reflection amplitude and phase for the transverse electric (TE) and transverse magnetic (TM) polarizations (for the oblique incident angle of 33.9° at 810 nm). Reflection coefficients are found through simulating a uniform array of nano-posts under oblique illumination (61-33.9°) with TE and TM polarized light, as shown in FIGS. 4-5. The simulated reflection phase as a function of the nano-posts side lengths are shown in FIG. 4 panel b and FIG. 5 for TE and TM polarizations. The lines (405) and (505) highlight the path through the $D_x$-$D_y$ plane along which the reflection phase for the TE and TM polarizations is almost equal. In addition, having almost the same reflection phases for the TE and TM polarizations holds true for the whole desired 760 nm-860 nm bandwidth. The nano-post dimensions calculated from this path were used to implement the two focusing metasurfaces.

The blazed grating metasurface of FIG. 2 has a periodic phase profile (with a period of 1) that deflects normally incident light to a large angle inside the substrate. With a proper choice of the lattice constant (250 nm, in this example), its structure can also be periodic. This different structure and operation require a different design approach. The periodicity of the grating allows for its efficient full-wave simulation which can be used to optimize its operation over the bandwidth of interest. A starting point for the optimization was chosen using the recently developed high-NA lens design method, and the structure was then optimized using the particle swarm optimization algorithm to simultaneously maximize deflection efficiency at a few wavelengths in the band for both polarizations.

Figure 6:
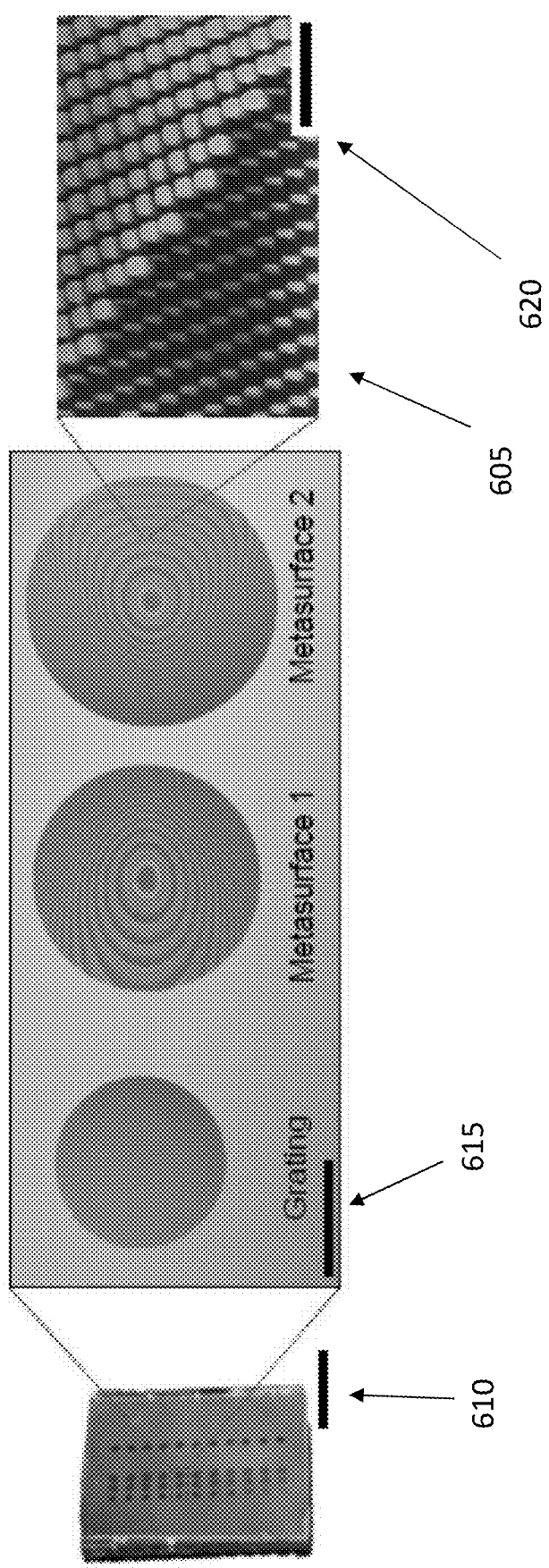
FIGS. 6-9 illustrate experimental characterization results.

The spectrometer device was fabricated using conventional micro- and nano-fabrication techniques. First, a 395-nm-thick layer of α-Si was deposited on a 1-mm-thick fused silica substrate. All metasurfaces were then patterned using electron beam lithography in a single step, followed by a pattern inversion through the lift-off and dry etching processes. The metasurfaces were capped by a ~2-thick SU-8 layer, and a 100-nm-thick gold layer was deposited as the reflector. A second reflective gold layer was deposited on the second side of the substrate. Both the input and output apertures (with diameters of 790 micrometers and 978 micrometers, respectively) were defined using photolithography and lift-off. An optical microscope image of the three metasurfaces, along with a scanning electron micrograph of a part of the fabricated device are shown in FIG. 6.

Figure 7:
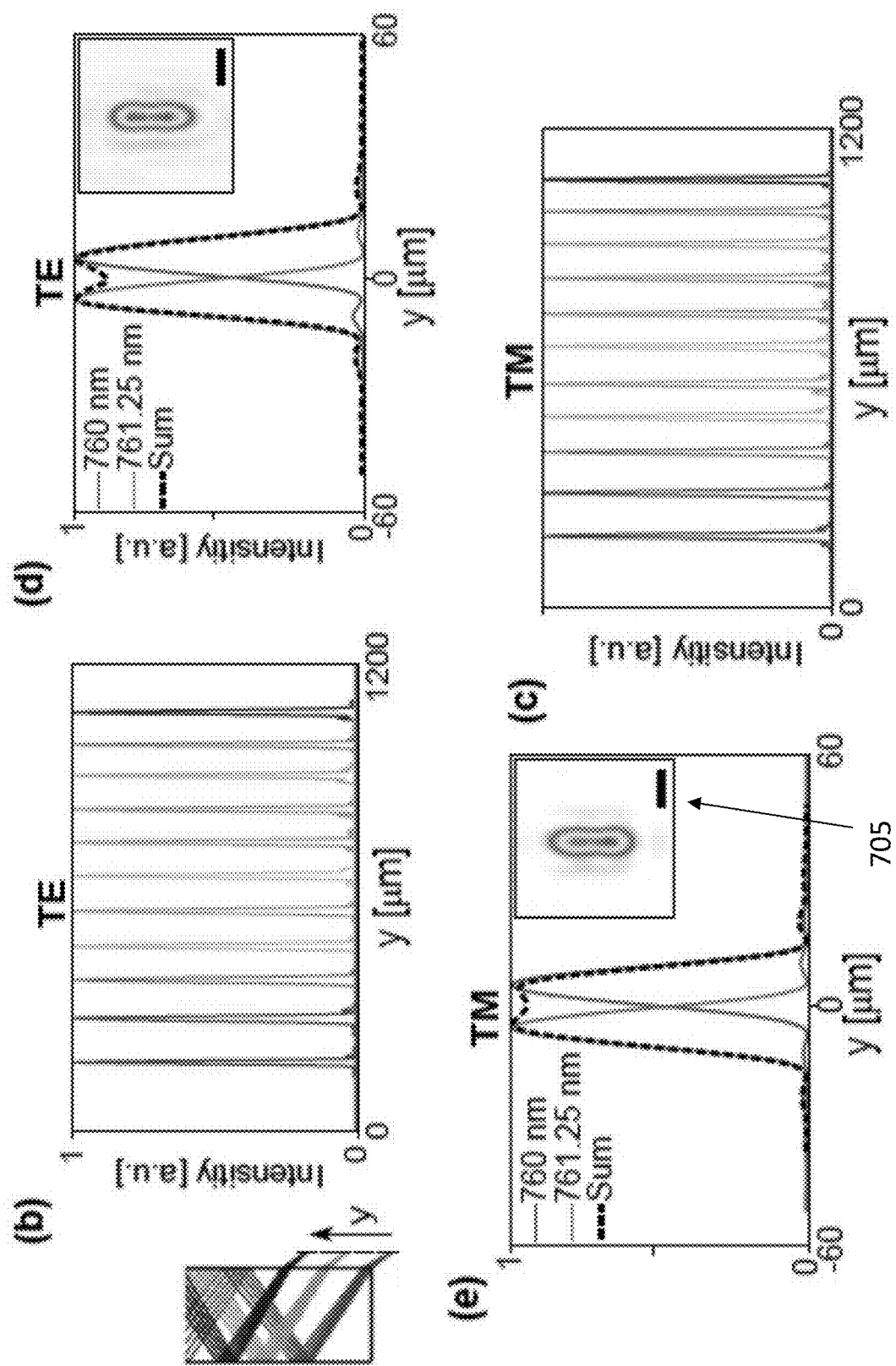
Figure 8:
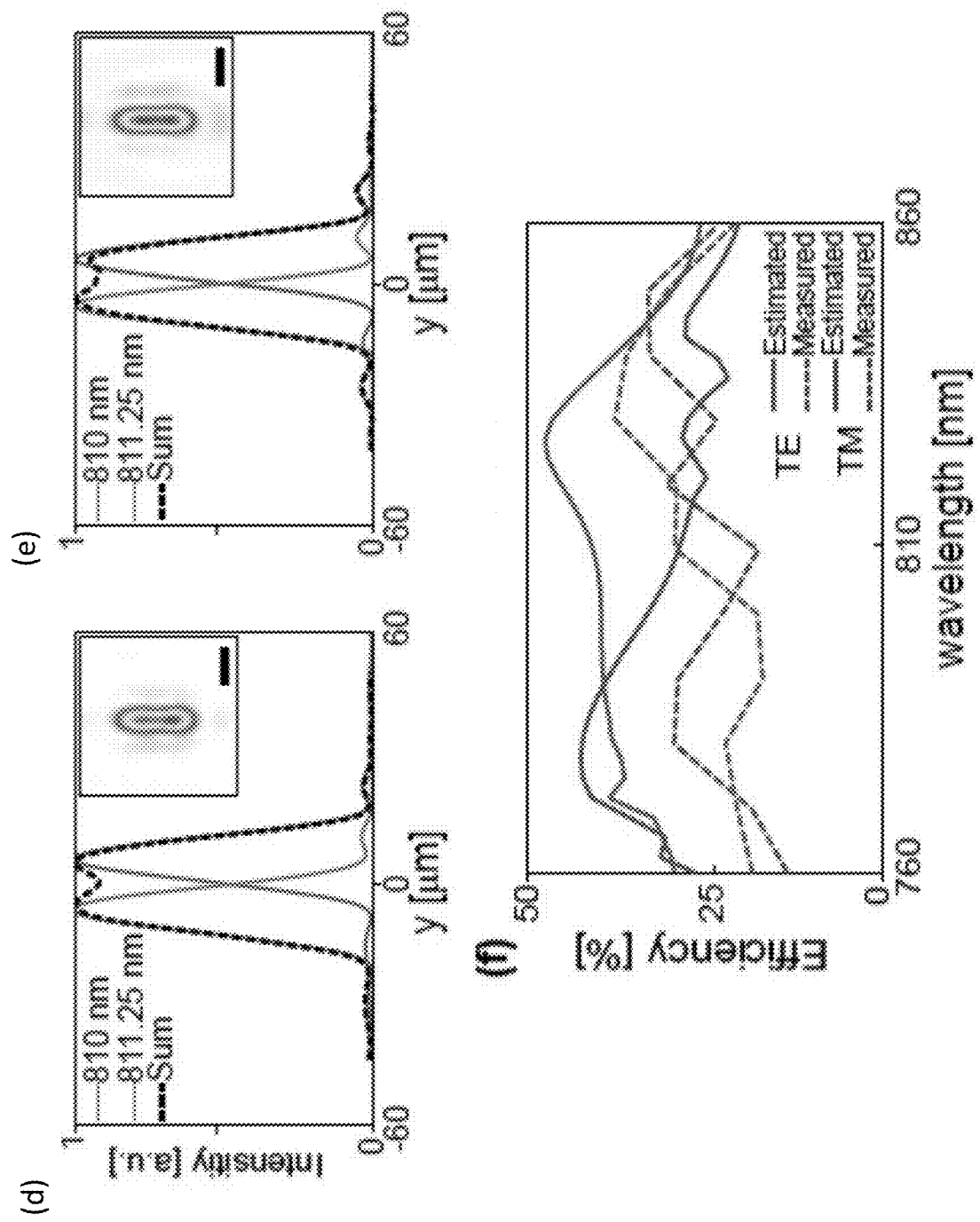
Figure 9:
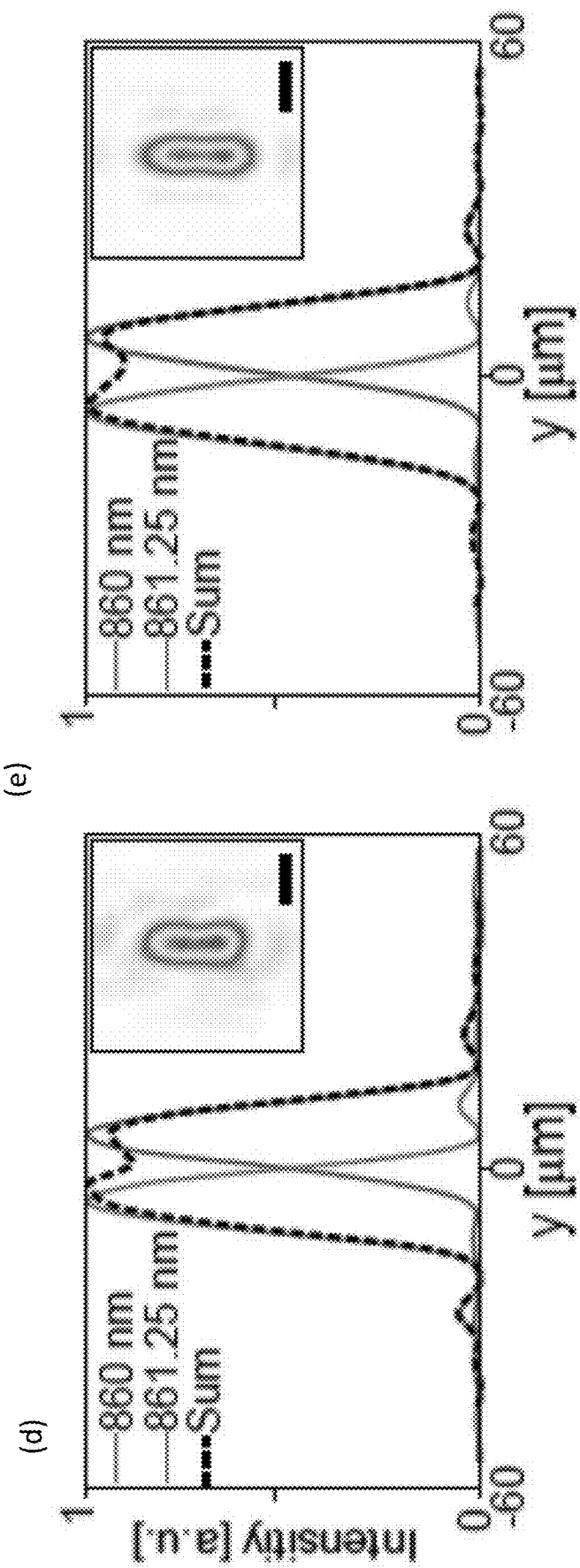

To experimentally characterize the spectrometer, a normally incident collimated beam from a tunable continuous wave laser was shined on the input aperture of the device. A custom-built microscope was used to image the focal plane of the spectrometer, ~200 outside its output aperture. The input wavelength was tuned from 760 nm to 860 nm in steps of 10 nm, and the resulting intensity distributions were imaged using the microscope. The resulting one-dimensional intensity profiles are plotted in FIG. 7 panel b and FIG. 7 panel c for TE and TM polarizations. The intensity profiles were measured over the whole 1.2-mm length of the y-direction in the focal plane (as shown in FIG. 7) at each wavelength. The background intensity is beyond visibility in the linear scale profiles plotted here for all wavelengths. FIGS. 7-9 panel d and panel e show the measured intensity profiles for three sets of close wavelengths, separated by 1.25 nm. FIGS. 7-9 also shows the corresponding two-dimensional intensity distribution profiles. For all three wavelengths, and for both polarizations the two peaks are resolvable. The experimentally obtained spectral resolution has an average resolution for both polarizations of ~1.2 nm, which is slightly worse than the theoretically predicted value (~1.1 nm).

The difference can be attributed mostly to practical imperfections such as the substrate having an actual thickness different from the design value and thickness variation. In addition, the metasurface phases are slightly different from the designed profiles due to fabrication imperfections. The angular sensitivity/tolerance of the device was also measured with respect to polar and azimuthal angle deviations from 0 incidence angle, in the x-z and y-z plane. In the y-z plane the maximum tilt angle to maintain the same 1.25 nm resolution is ±0.15°, while in the x-z plane the device has a ±1° degree acceptance angle. The measurement results match well with the predictions from ray-tracing simulations.

The measured and calculated focusing efficiencies are plotted in FIG. 8 panel f. The focusing efficiency, defined as the power passing through a ~30-diameter pinhole around the focus divided by the total power hitting the input aperture, was measured. For both polarizations, the average measured efficiency is about 25%. As seen from the measured efficiency curves, the optimization of the blazed grating efficiency versus wavelength and the choice of the design parameters to minimize variations in the phase-dispersion for the doublet metasurface lens, have resulted in a smooth measured efficiency. An estimate for the expected efficiency (shown as simulated efficiency in FIG. 8 panel f) is calculated by multiplying the deflection efficiency of the grating, the efficiency of seven reflections off the gold mirrors, the input and output aperture transmission efficiencies, and the average reflectivities of the uniform nano-post arrays (as an estimate for the two focusing metasurface efficiencies). It can be noted that considering only the reflection losses at the interfaces (nine reflective ones, and two transmissive ones) reduces the efficiency to about 48%, showing a close to 50% efficiency for the three metasurfaces combined.

It is possible to attribute the remaining difference between the measured and estimated values to fabrication imperfections (e.g., higher loss for the actual gold mirrors, and imperfect fabrication of the metasurfaces), the lower efficiency of the metasurfaces compared to the average reflectivity of uniform arrays, and to the minor difference from the designed value of the metasurface phase profiles at wavelengths other than the center frequency.

In the following, an experimental demonstration of the operation of the metasurface spectrometer is described, showing its capacity to measure dense optical spectra. The spectrometer is used to measure the transmission spectra of two different samples. In the first experiment, the spectrum of a wideband source was measured. The wideband source is a super-continuum laser source, filtered with an 840-nm short-pass filter. The source is measured both with the metasurface spectrometer (MS) described in the present disclosure, and a commercial optical spectrum analyzer (OSA). By dividing the spectra measured by the two devices, a calibration curve is extracted to account for variations in the metasurface spectrometer, as well as non-uniformities in the responsivity of the optical setup used to image the focal plane. The optical setup includes the objective lens and the camera, as well as the optical fiber used to couple the signal to the OSA. The measured spectra and the extracted calibration curve are plotted in FIG. 10.

Figure 11:
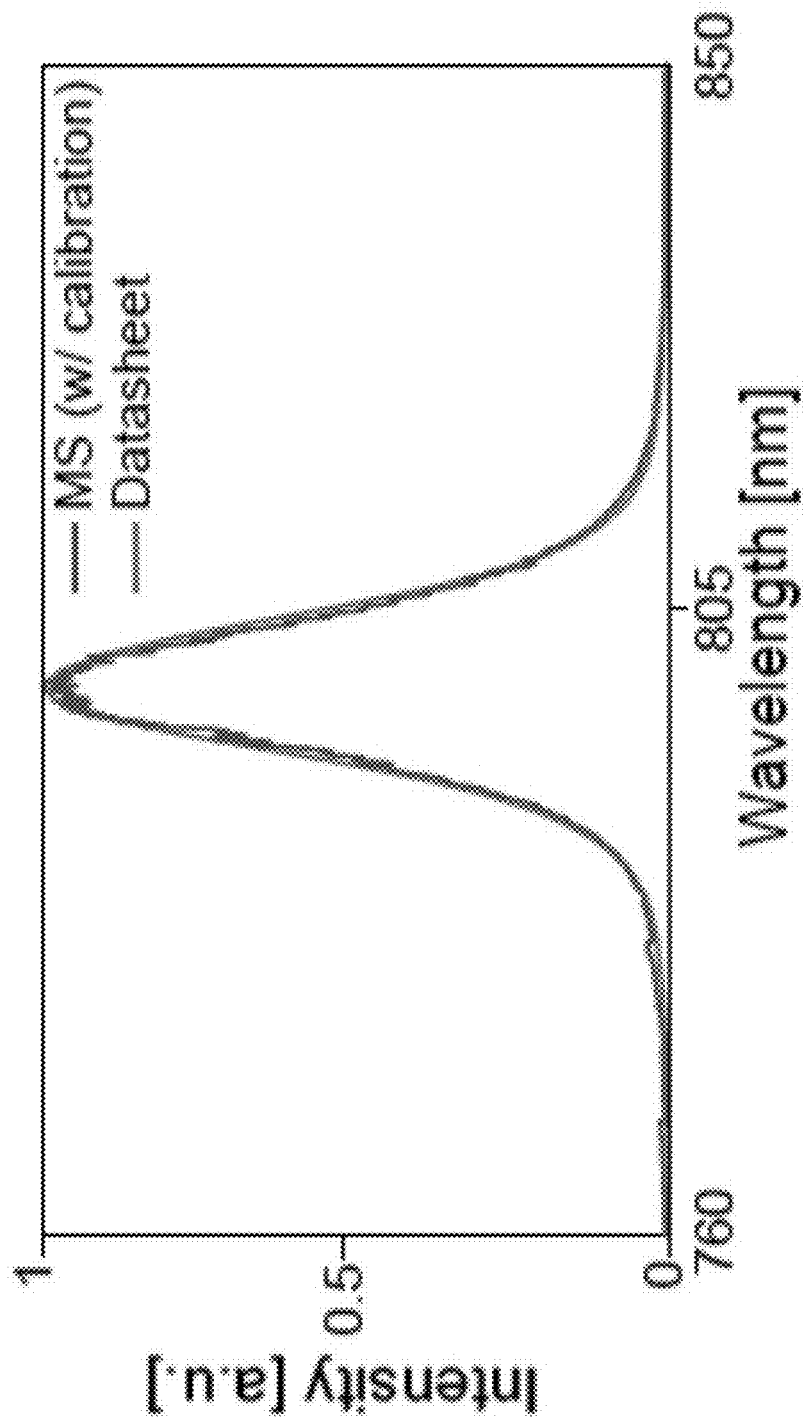

The calibration curve was then used to measure the transmission spectrum of a band-pass filter with a nominal 10 nm full width at half maximum bandwidth and centered at 800 nm. The measured spectrum, along with the transmission spectrum obtained from the filter datasheet, is plotted in FIG. 11, showing a good agreement. Subsequently, the metasurface spectrometer is used to measure the optical depth of a Nd:YVO$_4$ crystal sample. The spectrum measured with the metasurface spectrometer (after calibration) is compared with the transmission spectrum of the same sample measured with the OSA in FIG. 12. Dividing the spectrum without and with the sample, the optical depth of the sample is extracted and is plotted in FIG. 13. A good agreement is observed between the two measurement results. It can be noted that the Nd:YVO$_4$ crystal sample was cut though the z-plane, resulting in an equal absorption spectrum for the two polarizations. Therefore, it can be assumed that all spectral measurements were done with the same state of input polarization. This justifies the use of only one calibration curve for all the measurements.

The measured efficiency of the spectrometer demonstrated above is about 25%. This value can be significantly increased to about 70% by using mirrors with higher reflectivity, e.g., DBRs or high contrast grating mirrors, and anti-reflection coatings on the input and output apertures. In addition, more advanced optimization techniques could be exploited to optimize the diffraction grating to achieve high efficiency and polarization insensitivity. Implementing these changes and optimizing the fabrication process, it is possible to expect achieving efficiencies exceeding 70% for the spectrometer.

The metasurface spectrometers are fabricated in a batch process, and therefore many of them can be fabricated on the same chip, even covering multiple operation bandwidths. This can drastically reduce the price of these devices, allowing for their integration into various types of systems for different applications. In addition, the structure described herein is compatible with many of the techniques developed for the design of multi-wavelength metasurfaces, and therefore one might be able to combine different optical bandwidths into the same device (e.g., using a grating that deflects to the right at one bandwidth, and to the left at the other), resulting in compact devices with enhanced functionalities.

The optical throughput (etendue) is a fundamental property of any optical system, setting an upper limit on the ability of the system to accept light from spatially incoherent sources. It can be estimated as the product of the physical aperture size and the acceptance solid angle of the system. Furthermore, the total etendue of a system is limited by the element with the lowest etendue. To calculate the throughput of the metasurface spectrometer, simulations and measurements were performed to characterize its acceptance angle. According to the measurement results, the acceptance angle of the system is about 2 degrees in the horizontal direction, and 0.3 degrees in the vertical direction. Given this and the input aperture dimensions, the optical throughput of our device is calculated to be ~90 Sr$\mu$m$^2$. For comparison, the etendue of optical systems operating around 1 $\mu$m that utilize single-mode input channels (i.e., most optical spectrometers based on integrated optics platforms) is around ~1 Sr$\mu$m$^2$.

Furthermore, the spectrometer described above is optimized for maximum sensitivity and not throughput. To show that the achieved throughput here does not denote an upper limit for the etendue of a folded metasurface spectrometer with similar characteristics (i.e., resolution, bandwidth, etc.), a second device was designed with a throughput of ~13000 Sr$\mu$m$^2$. Comparing this spectrometer with the optical throughput of several compact spectrometers known in the art, it can be noted that the spectrometers designed using the folded metasurface platform can collect 2 to 4 orders of magnitude more light compared to on-chip spectrometers that are based on single/few-mode input waveguides, resulting in a much higher sensitivity.

The development of thin and compact optical elements and systems has been a key promise of optical metasurfaces. Although many optical devices have been developed in thin and compact form factors using metasurfaces, significantly reducing the volume of optical systems, using metasurfaces has not been previously demonstrated due to the requirement of free-space propagation in many systems (e.g., imaging systems, spectrometers, etc.). The folded metasystem configuration described in the present disclosure can significantly reduce the size of many of these optical systems using the substrate as the propagation space for light. Based on this configuration, a 1-mm-thick spectrometer was demonstrated, with a 7-mm$^3$ volume, reduced by a factor of ten compared to the same system implemented in an unfolded scheme (twenty times reduction, if the same system was designed in air).

The spectrometer has a resolution of ~1.2 nm over a 100 nm bandwidth (>12%) in the near infrared. Using this design, multiple spectrometers can be fabricated on the same chip and in the same process, significantly reducing the costs and enabling integration of spectrometers covering multiple optical bands into consumer electronics. Moreover, by improving the angular response of the current device it is possible to design a compact hyperspectral imager capable of simultaneous one-dimensional imaging and spectroscopy. The metasurface structures described herein can also be used for on-chip interferometers, imaging systems, and other devices performing complex transformations of the field.

FIG. 2 panel a illustrates ray tracing simulation results of the folded spectrometer, shown at three wavelengths (225) in the center and two ends of the band. The system consists of a blazed grating that disperses light to different angles, followed by two metasurfaces optimized to focus light for various angles (corresponding to different input wavelengths). The grating has a period of 1 micrometer, and the optimized phase profiles for the two metasurfaces are shown (220). FIG. 2 panel b illustrates simulated spot diagrams for three wavelengths: center and the two ends of the band. The scale bars (230) are 5 micrometers.

Figure 3:
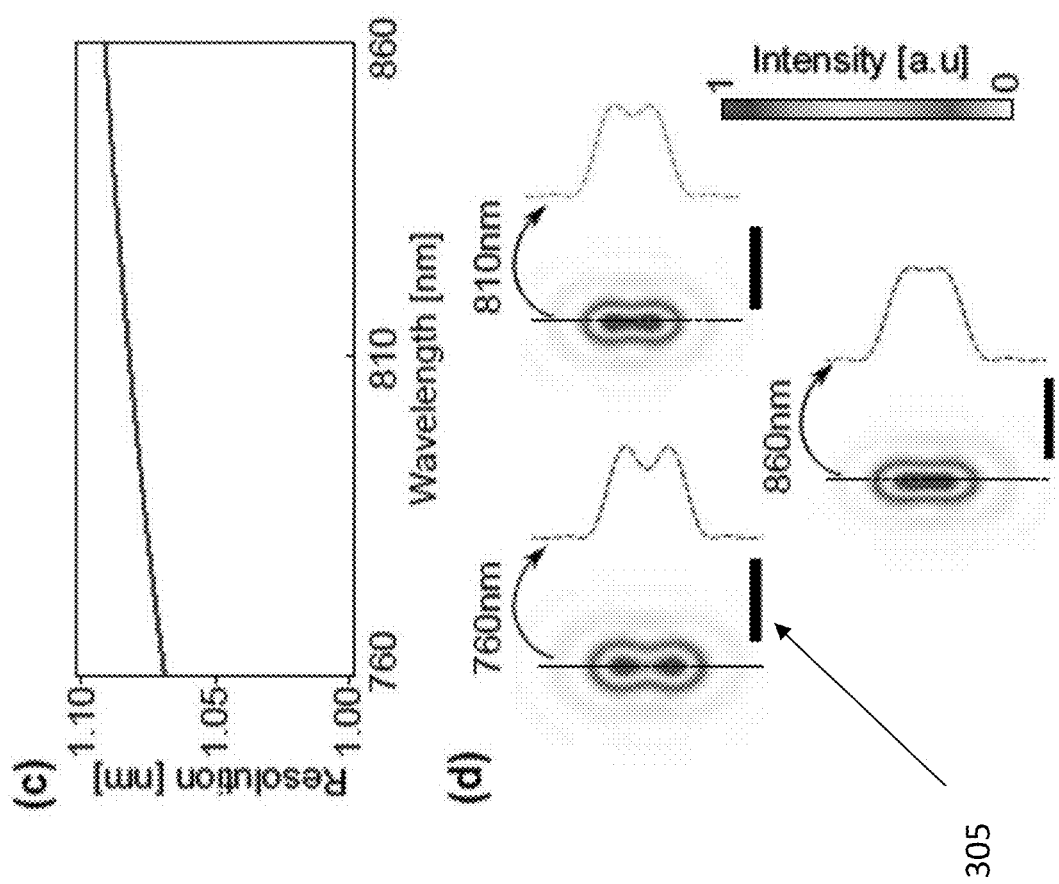

FIG. 3 panel c illustrates the spectral resolution of the spectrometer, which is calculated from simulated Airy disk radii and the lateral displacement of the focus with wavelength. FIG. 3 panel d illustrates the simulated intensity distribution for two wavelengths separated by 1.1 nm around three different center wavelengths of 760 nm, 810 nm, and 860 nm. The intensity distributions show that wavelengths separated by 1.1 nm are theoretically resolvable. The scale bars are 20 micrometers (305).

FIG. 4 panel a illustrates a schematic of the reflective rectangular meta-atom. The meta-atom consists of α-Si nano-posts (420) on a fused silica substrate (425), capped by a layer of SU-8 polymer (415) and backed by a gold mirror (410). The nano-post in this example is 395 nm tall and the lattice constant is 250 nm for the blazed grating and 246 nm for the focusing metasurfaces. FIG. 4 panel b and FIG. 5 illustrate the simulated reflection phase plotted for TE and TM polarizations. The black curves (405,505) highlight the path through the $D_x$-$D_y$ plane that results in equal phases for the two polarizations. Nano-posts on this path were used to design the two focusing metasurface elements to make them insensitive to the input polarization.

FIG. 6 illustrates an optical microscope image of the fabricated device and metasurfaces before deposition of the second gold layer. The inset (605) shows a scanning electron micrograph of a portion of one of the two focusing metasurfaces. The scale bars are 10 mm (610), 500 micrometers (615), and 1 micrometer (620). FIG. 7 panels b and c illustrate one dimensional focal spot profiles measured for several wavelengths in the bandwidth along the y-direction for TE and TM polarizations. The wavelengths start at 760 nm and increase at 10 nm steps up to 860 nm. FIGS. 7-9 panels d and e illustrate the measured intensity distributions for two input wavelengths that are 1.25 nm apart for TE and TM polarizations. The measurements were carried out at the center and at the two ends of the wavelength range for both polarizations. The insets show the corresponding 2-dimensional intensity profiles, demonstrating two resolvable peaks. The scale bars (705) are 10 micrometers. FIG. 8 panel f illustrates the calculated and measured absolute focusing efficiencies of the spectrometer for TE and TM polarizations. Both polarizations have average measured efficiencies of ~25%.

Figure 10:
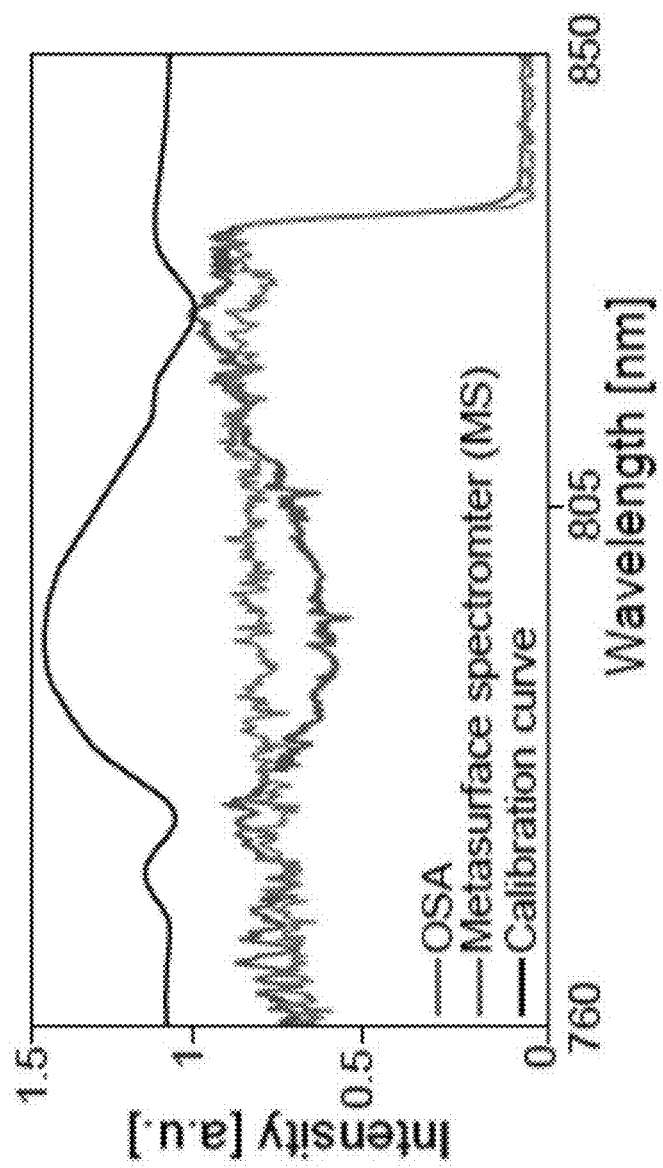
FIGS. 10-13 illustrate sample spectrum measurement results.
Figure 12:
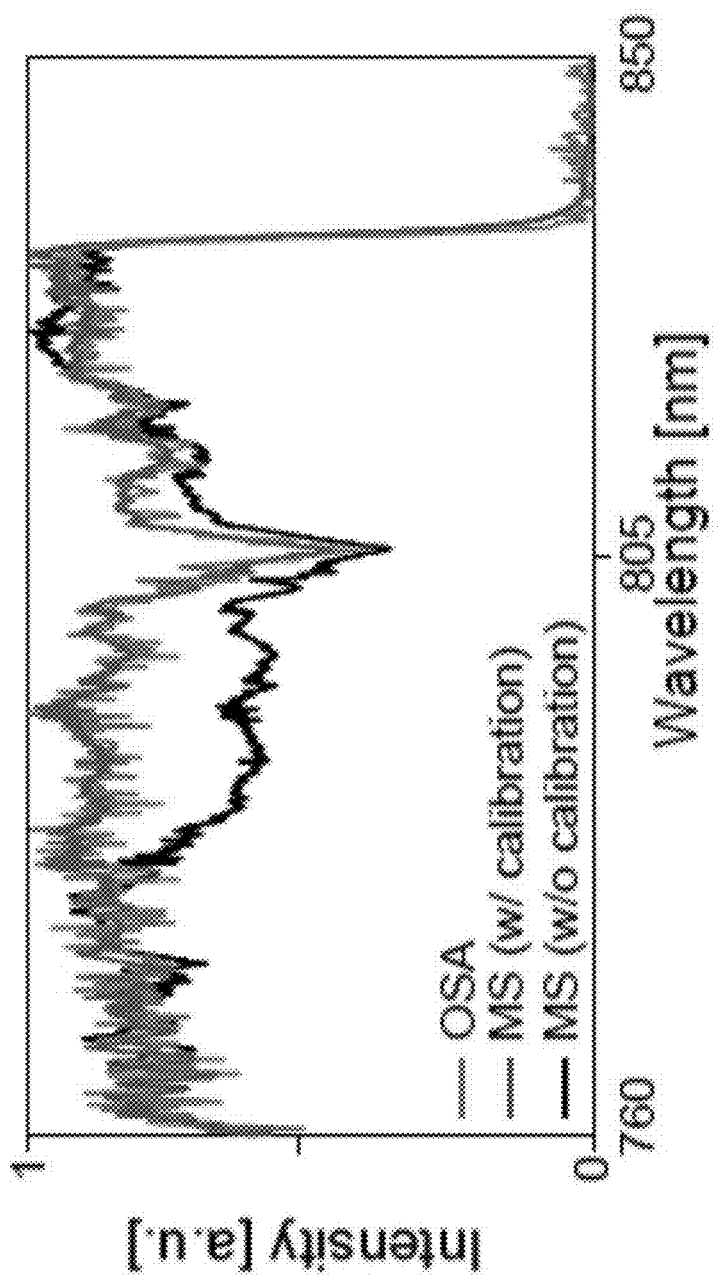
Figure 13:
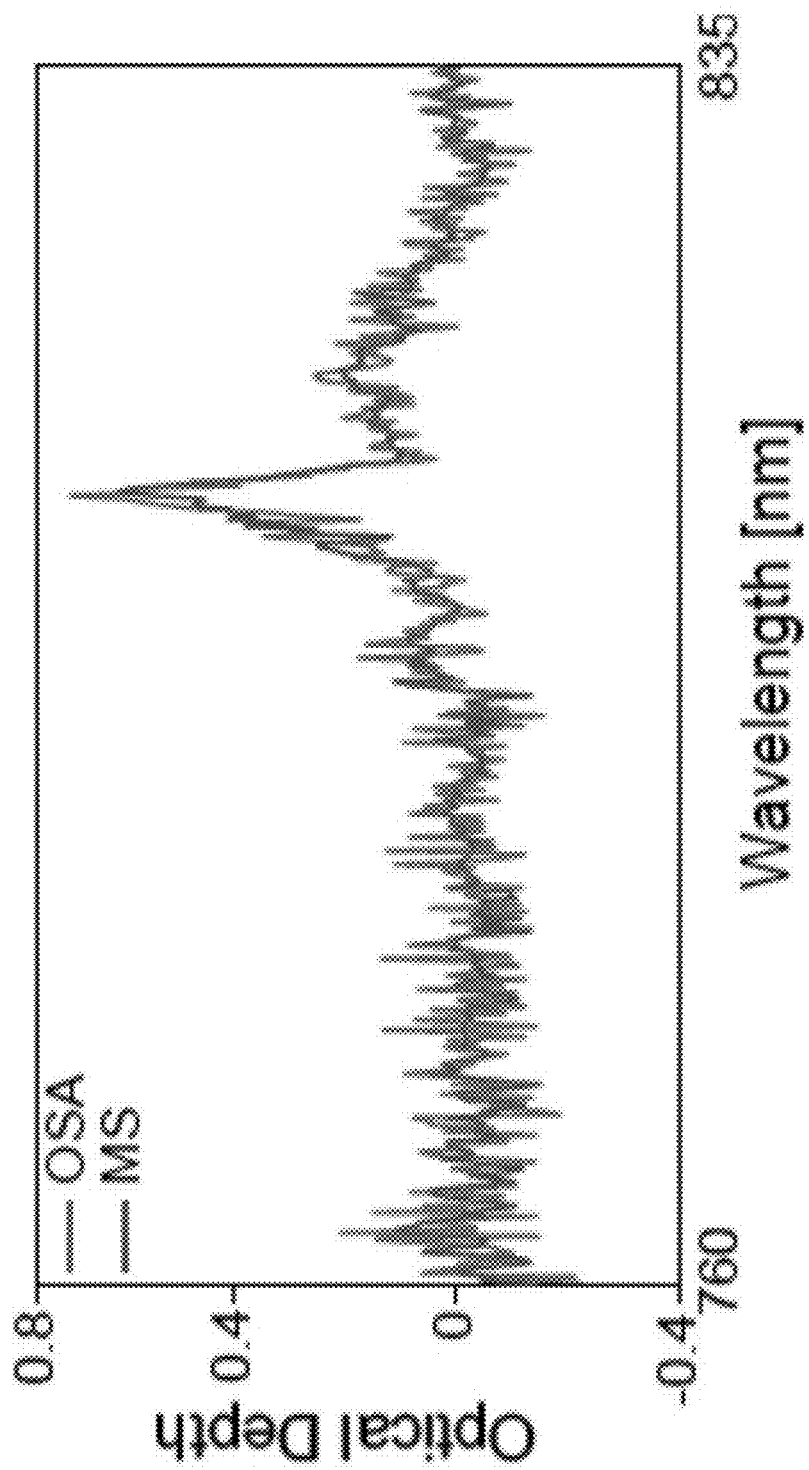

FIGS. 10-13 illustrate sample spectrum measurement results. FIG. 10 illustrates the spectrum of a wideband source (a super-continuum laser with an 840 nm short-pass filter) measured by a commercial OSA and the metasurface spectrometer (MS). This measurement was used to extract the calibration curve. FIG. 11 illustrates a spectrum of a 10-nm band-pass filter centered at 800 nm measured by the MS, compared to the spectrum acquired from the filter datasheet. FIG. 12 illustrates a transmission spectrum of a Nd:YVO$_4$ crystal sample measured both with a commercial OSA and the MS. FIG. 13 illustrates the optical depth of the sample extracted from the spectrum measurements both with the OSA and the MS.

Ray tracing simulations of the spectrometer were performed. In the simulations, metasurfaces were assumed to be phase-only diffractive surfaces. The grating was modeled as a blazed grating with a linear phase along the direction of dispersion (y), and independent of the other direction (x). The phase was chosen to correspond to a period of 1 micrometer, resulting in deflection angles of 31.6° and 36.35° at 760 nm and 860 nm, respectively. The angles were chosen such that the focused light could be captured by an objective with a numerical aperture of 0.95, while maximizing the dispersive power. The second and third surfaces were modeled as a summation of Cartesian coordinate polynomials (Binary 1), $\Sigma_{n,m} a_{m,n} x^m y^n$, and cylindrical coordinate radially symmetric polynomials (Binary 2) $\Sigma_i b_{2i} \rho^{2i}$. The coefficients were optimized to reduce geometric aberrations by minimizing the root mean square geometric spot radii for several input wavelengths covering the bandwidth.

Figure 18:
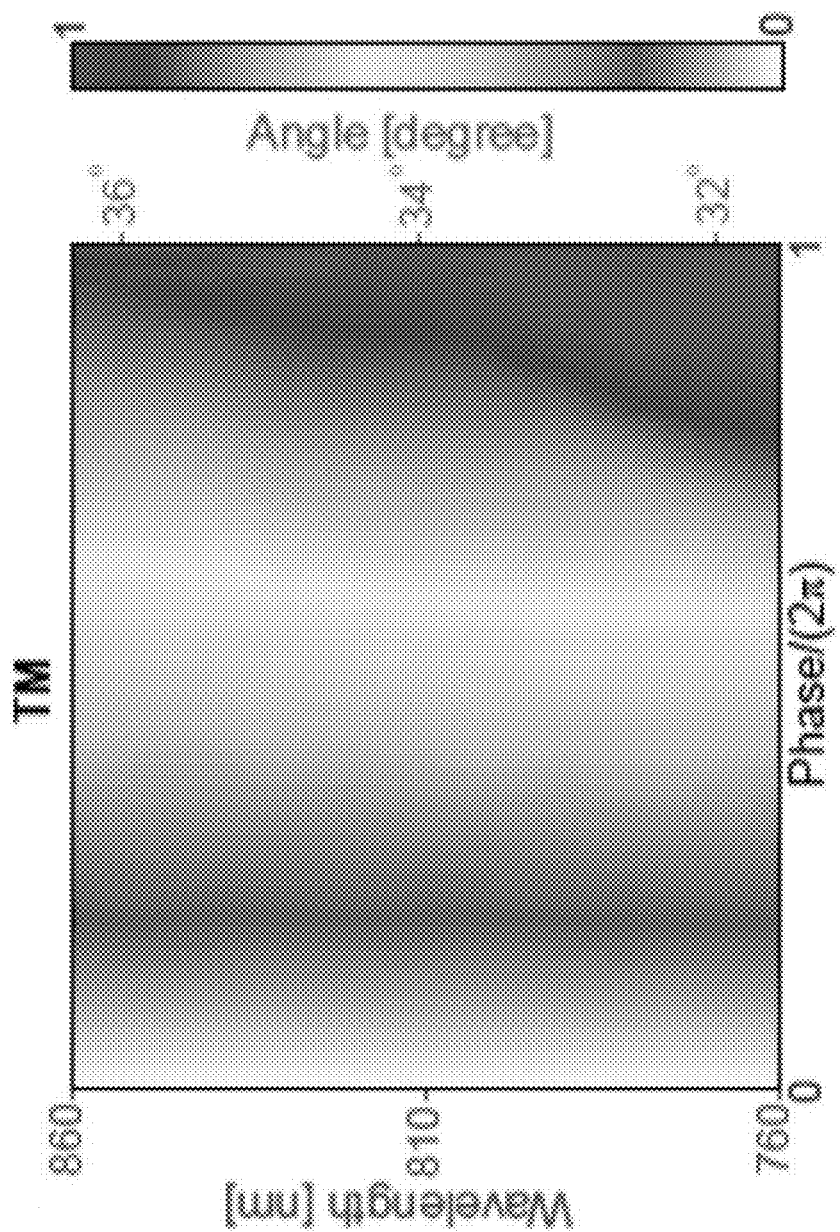

As shown in to FIG. 18, all focal spots are optimized and are within the airy disks. This indicates that the designed spectrometer has small geometrical aberrations. The diffraction-limited resolution curve is also obtained. The simulations and optimizations were first performed in an unfolded configuration for simplicity. There were several constraints in finding the sizes for input and output apertures. Two opposing factors existed in determination of the 790 micrometers input aperture diameter. On one hand, a larger input aperture results in a higher throughput and more captured light as well as a higher numerical aperture and potentially better resolution. On the other hand, the aperture size for the folded platform cannot be arbitrarily large because different metasurfaces should not overlap. Thus, the 790 micrometers aperture diameter was chosen in the ray-tracing simulations as the largest size for which metasurface overlap can be avoided and diffraction-limited focusing can be achieved. The output aperture spatially filters the out of band wavelengths while passing through the bandwidth of interest. Therefore, its size was chosen as the smallest possible aperture that allows for all wavelengths of interest to pass through. Using the ray-tracing simulations, this optimum size was found to be 978 micrometers.

The rigorous coupled wave analysis (RCWA) technique was used to obtain reflection phases of the nano-posts. For each specific set of dimensions, a uniform array of the α-Si nano-posts was illuminated with a plane wave at the wavelength of 810 nm under an illumination angle of 33.9° and the reflected amplitudes and phases were extracted for each polarization. To choose the height of the nano-posts, these simulations were performed for nano-posts with square cross-sections and different heights and side lengths. The height was then chosen to minimize the variation of the derivative of the phase with respect to wavelength for different side lengths, while providing a full 2π phase coverage and high reflectivity.

Considering the results, a thickness of 395 nm was chosen. Although this height is slightly less than λ/2, it is large enough to provide a full 2π phase coverage as the device operates in reflection mode. The lattice constant was chosen to be 246 nm in order to satisfy the sub-wavelength condition and avoid higher order diffractions, which require $l_c < \lambda/n(1+\sin(\theta_{max}))$, where $l_c$ is the lattice constant, n is the refractive index of the substrate, and $\theta_{max}$ is the maximum deflection angle [2]. The value $\sin(\theta_{max})=1/n$ was chosen, since light traveling at larger angles will undergo total internal reflection at the output aperture. To make the two focusing metasurfaces polarization-insensitive, reflection phase and amplitudes were obtained for nano-posts with rectangular cross section under oblique illumination with both TE and TM polarizations. The design curves were then generated by determining a path in the $D_x$-$D_y$ plane along which TE and TM reflection phases are almost equal.

For designing the blazed diffraction grating, the same α-Si thickness of 395 nm was chosen (for ease of fabrication). The lattice constant was set to be 250 nm, so that a grating period contains four nano-posts, and the structure becomes fully periodic. This allows using periodic boundary conditions in the full-wave simulations of the structure, reducing the simulation domain size significantly. The initial values of the post widths were chosen using a recently developed high-NA metasurface design approach. The simulation results for nano-post-width vs reflection-phase and the initial post widths are plotted in FIG. 19. These values were then fed to a particle swarm optimization algorithm (using an RCWA forward solver) as a starting point. The algorithm optimizes the deflection efficiency of the grating for both polarizations at 11 wavelengths spanning the bandwidth of interest. The optimization parameters are the side lengths of the rectangular nano-posts, while their thickness and spacing is fixed. Deflection efficiencies of the initial and optimized gratings are plotted in FIG. 20. The corresponding nano-post widths for both gratings are given in Table 1.

TABLE 1

| Optimization | $D_{x1}$ | $D_{y1}$ | $D_{x2}$ | $D_{y2}$ | $D_{x3}$ | $D_{y3}$ | $D_{x4}$ | $D_{y4}$ |
|---|---|---|---|---|---|---|---|---|
| Maximizing first order diffraction Efficiency | 93.4 | 93.4 | 117 | 117 | 132.8 | 132.8 | 155.4 | 155.4 |
| Particle Swarm Optimization | 68 | 134 | 115.2 | 119.6 | 147.4 | 151.2 | 137.8 | 178.8 |

A summary of steps of the fabrication process is described below. A 395-nm-thick layer of α-Si was deposited on one side of a 1-mm-thick fused silica substrate through a plasma enhanced chemical vapor deposition process at 200° C. The metasurface pattern was then generated in a ~300-nm-thick layer of positive electron resist (spun for 1 minute at 5000 rpm) using an electron beam lithography system. After development of the resist in a developer, a ~70-nm-thick alumina layer was evaporated on the sample in an electron beam evaporator. After lift-off, this layer was used as a hard mask for dry etching the α-Si layer in a mixture of $SF_6$ and $C_4F_8$ plasma. The alumina layer was then removed in a 1:1 solution of $H_2O_2$ and $NH_4OH$. A ~2-thick layer of SU-8 polymer was spin-coated, hard-baked and cured on the sample to protect the metasurfaces. The output aperture (which is on the same side as the metasurfaces) was defined using photolithography and lift-off. A ~100-nm-thick gold layer was deposited as the reflective surface. To protect the gold reflector, a second layer of SU-8 2002 was used. To define the input aperture, a ~2-thick layer of SU-8 polymer was spin-coated and cured on the second side of the wafer to improve adhesion with gold. The input aperture was then defined in a process similar to the output aperture.

A second exemplary spectrometer was also designed, as discussed above, with significantly increased throughput. In order to achieve higher throughput, a larger input aperture was required, so the slab thickness was increased to 2 mm to give more freedom on the non-overlapping condition for the metasurfaces. The design has a 2.5 mm input aperture. To further improve the throughput, the acceptance angle of the device was increased. To achieve this goal, extra phase terms were added to the input diffraction grating. This helps with orienting the focuses on the image plane for different incident angles, as well as relaxing the condition for focusing in the x-direction. This in turn allows for increasing the input incident angle to ±15° degrees. In the final design, the power is distributed in an area close to 200 micrometers wide in the x-direction in the focal plane, instead of a diffraction limited focus. The device can distinguish between wavelengths spaced by 0.5 nm both at the center wavelength of 810 nm, and also at the side wavelengths of 760 nm and 860 nm. Based on the angular response of the device in the x-z and y-z planes, and also the input aperture size of the device, an etendue of around ~13000 Sr μm² is estimated.

Figure 14:
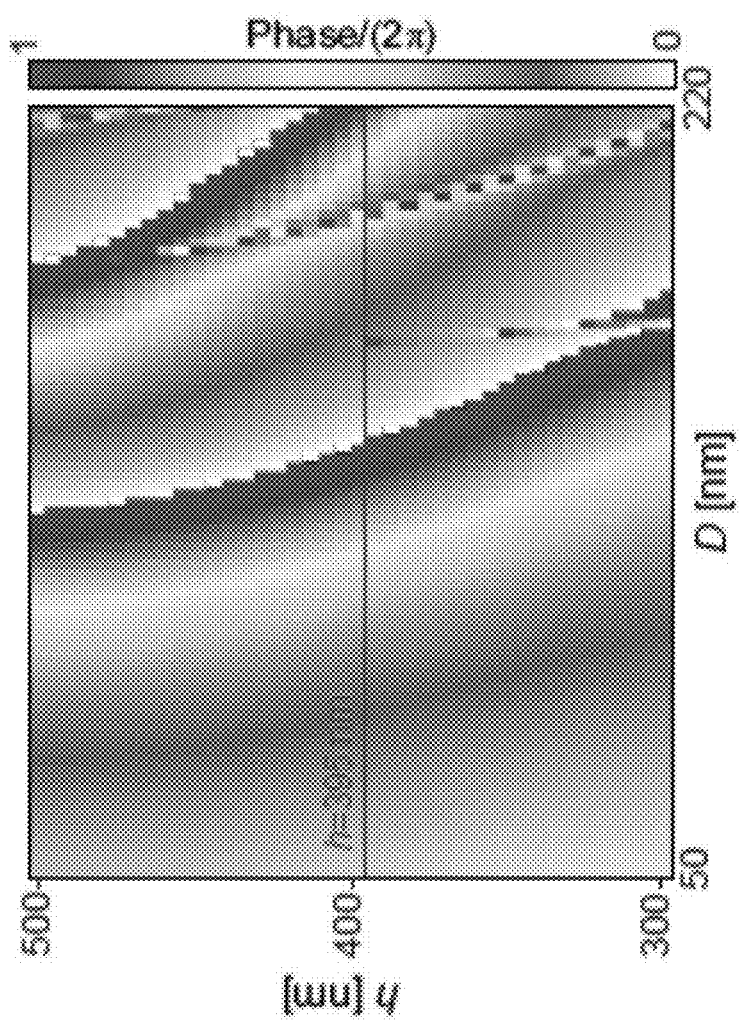
FIGS. 14-16 illustrate single post period lattice simulations.
Figure 15:
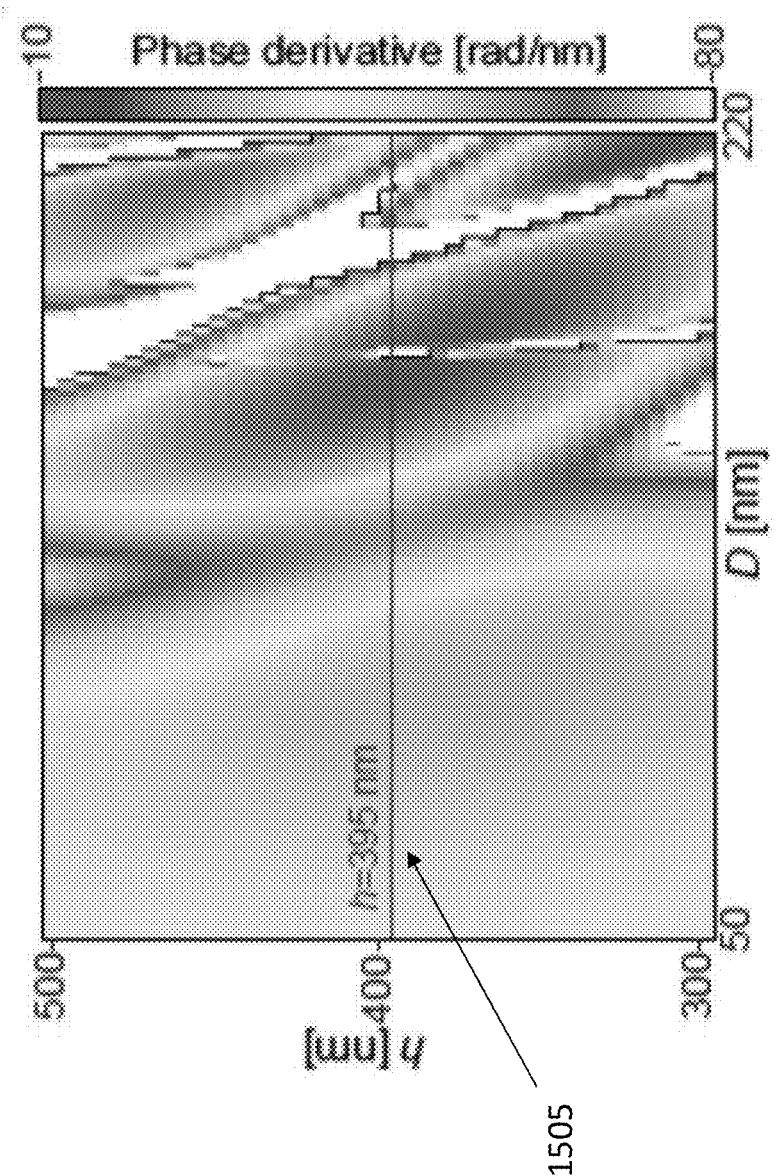
Figure 16:
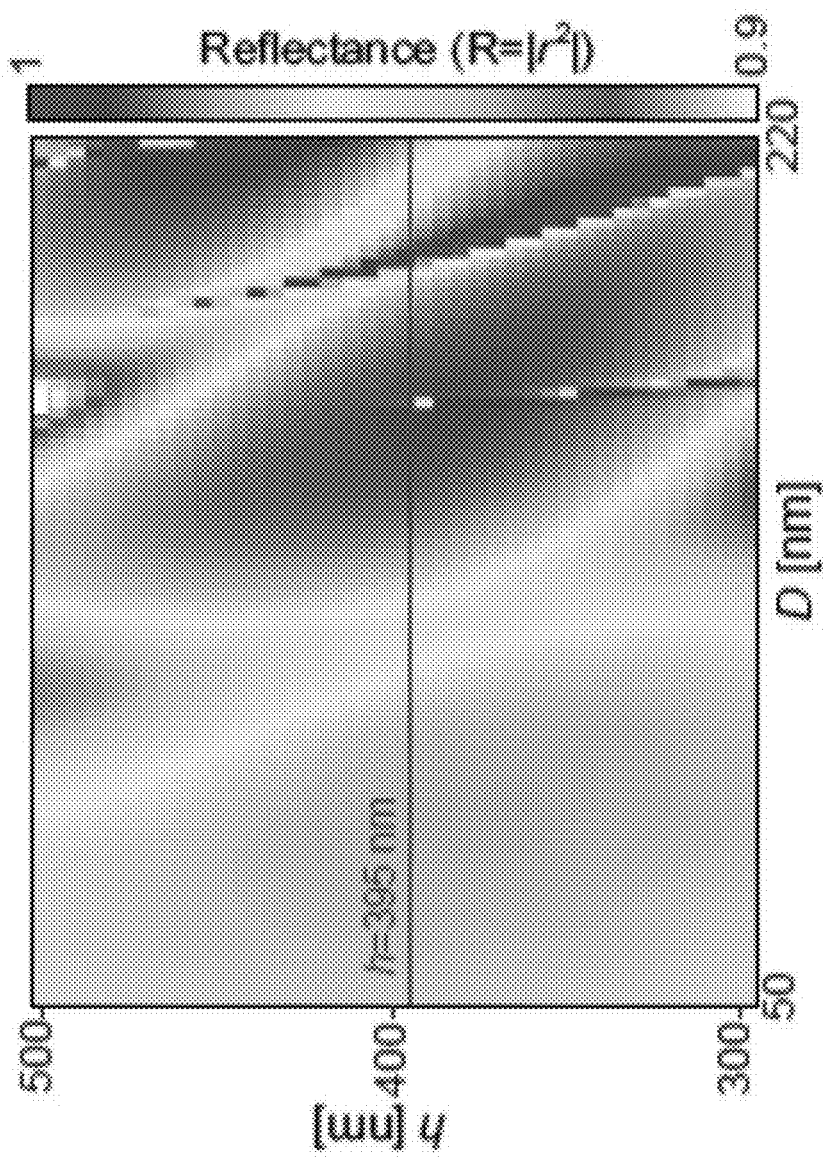

FIG. 14 illustrates a simulated reflection phase under TE illumination with 33.9° incident angle. FIG. 15 illustrates a derivative of the phase with respect to the wavelength calculated and plotted versus the height (h) and width of the post ($D_x=D_y=D$). The nano-post height that provides full $2\pi$ phase coverage with high reflectance while minimizing variation of the phase derivative is found to be h=395 nm (1505). FIG. 16 illustrates the reflectance as a function of post-width and height.

Figure 17:
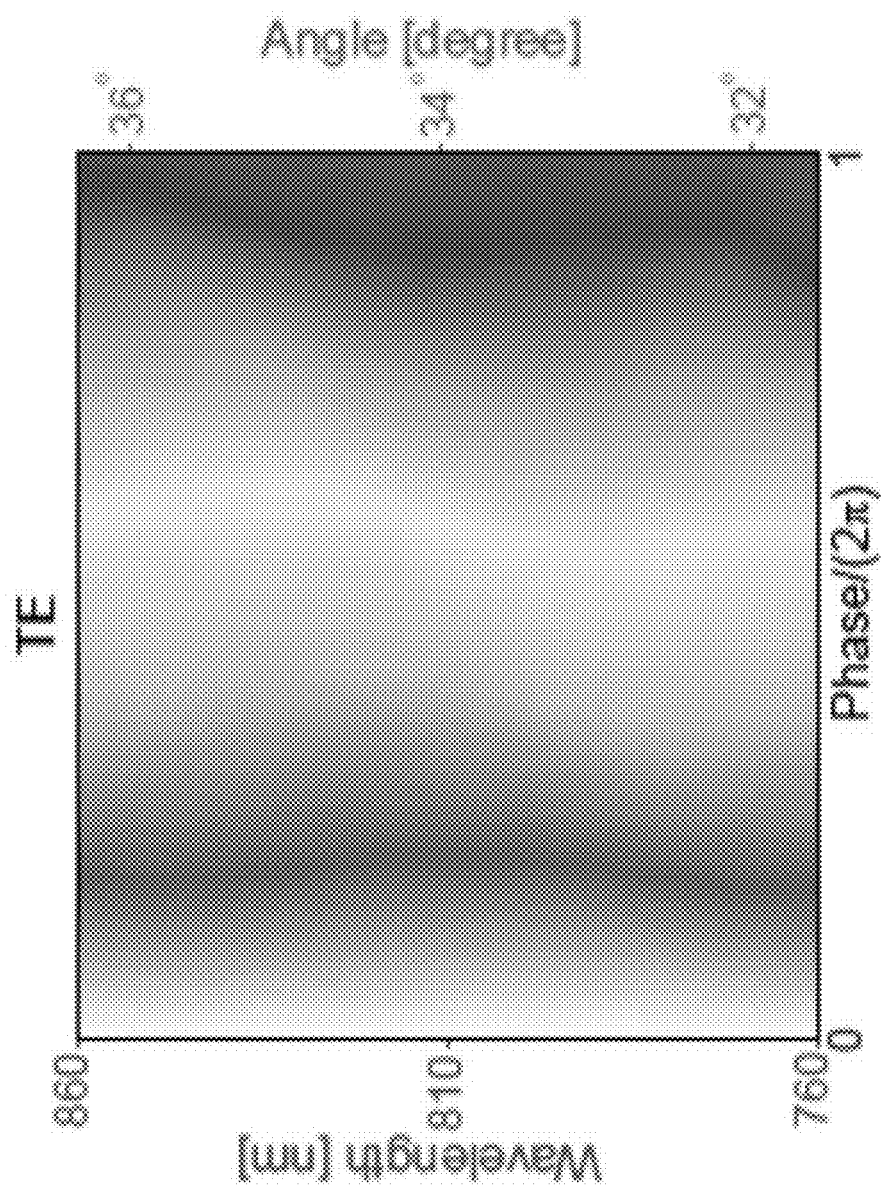
FIGS. 17-18 illustrate reflection phase variation versus wavelength.

FIG. 17 illustrates the reflection phase for TE polarized light from a uniform array of meta-atoms. As depicted by the vertical axis on the right, the simulation for each wavelength is performed under an incident angle corresponding to the deflection angle of the input blazed grating at that wavelength. FIG. 18 illustrates the same data of FIG. 17 but for TM polarization.

Figure 19:
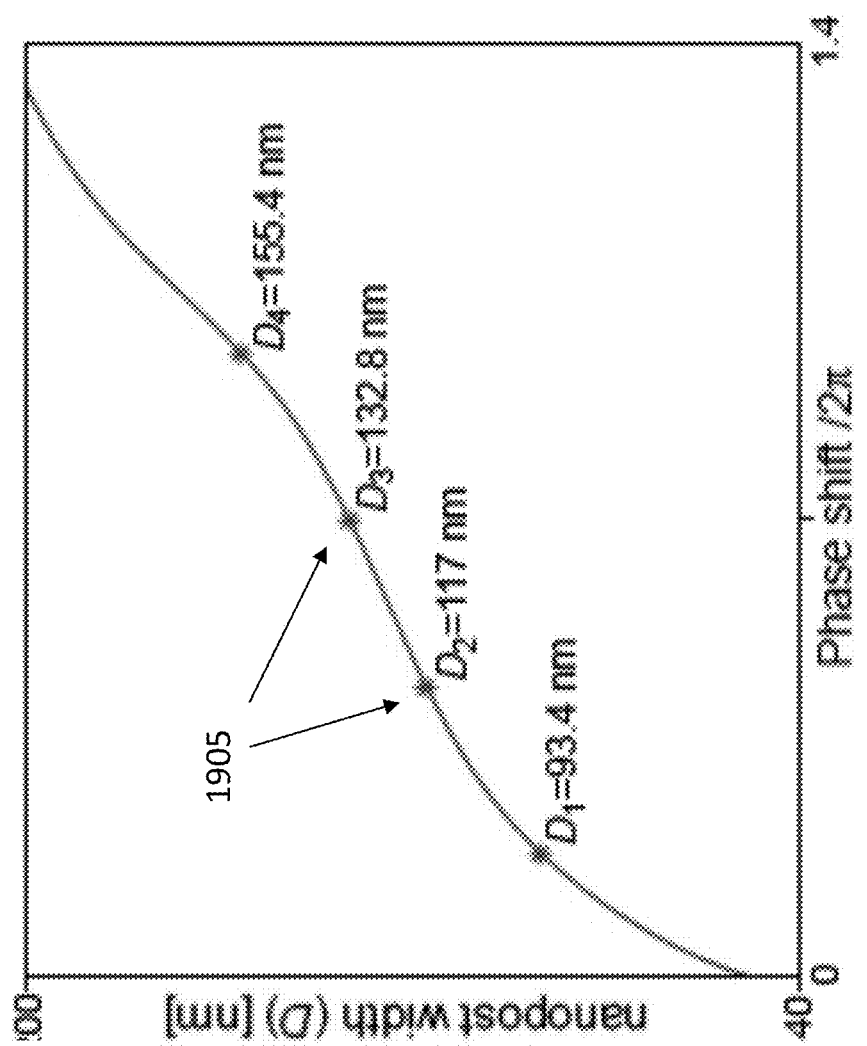
FIGS. 19-20 illustrate grating design curves and deflection efficiencies.
Figure 20:
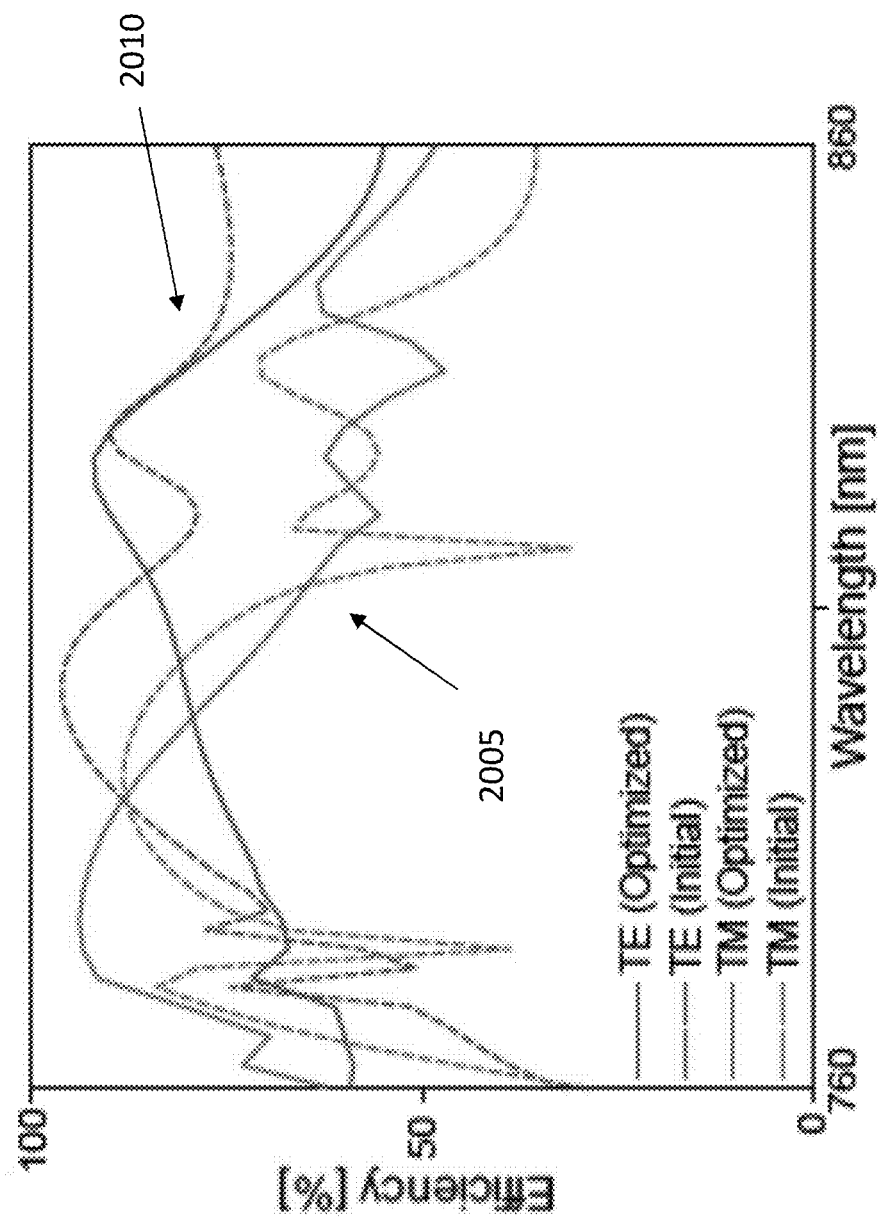

FIG. 19 illustrates post width versus reflection phase for 395-nm-tall posts on a square lattice with a 250-nm lattice constant. The points (1905) correspond to the nano-post sizes found from this graph that have the highest deflection efficiency over the bandwidth. FIG. 20 illustrates TE (2010) and TM (2005) polarization deflection efficiency curves versus wavelengths for the initial (1905) and optimized nano-post dimensions.

Figure 21:
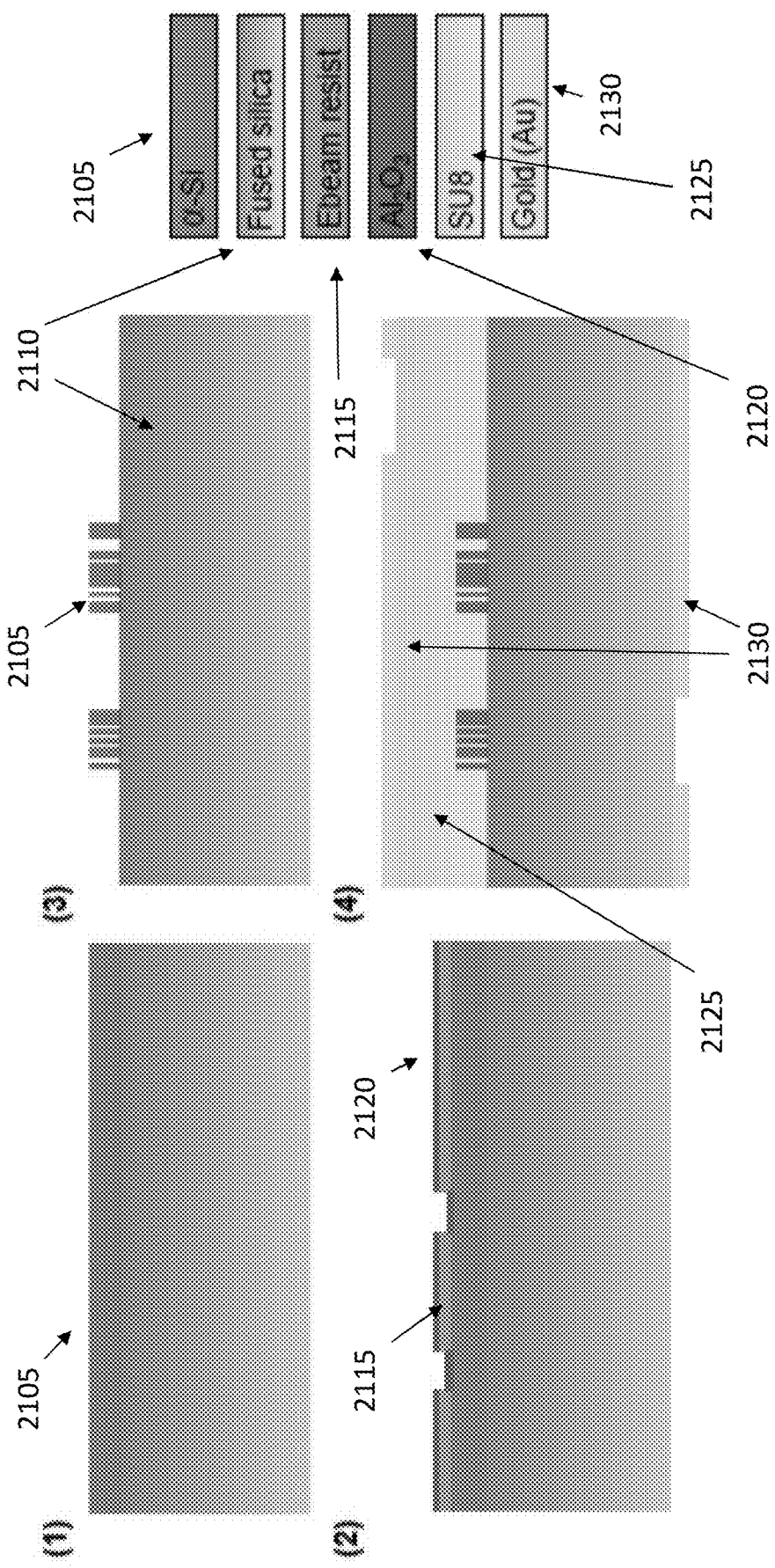
FIG. 21 illustrates fabrication steps.

FIG. 21 illustrates how a 395-nm-thick layer of α-Si (2105) is deposited on a 1-mm-thick fused silica substrate (2110) using PECVD (1). The metasurface pattern (3) is generated with electron beam lithography (2), negated and transferred to the α-Si layer via lift-off and dry-etching processes using a resist (2115) and alumina (2120). Both sides are covered (4) with an SU-8 layer (2125), and the input and output apertures are defined through photolithography and lift-off. In FIG. 21, only one side is shown as having an SU-8 layer as that layer remains on the structure as a protective layer. A gold layer (2130) is also deposited.

Figure 22:
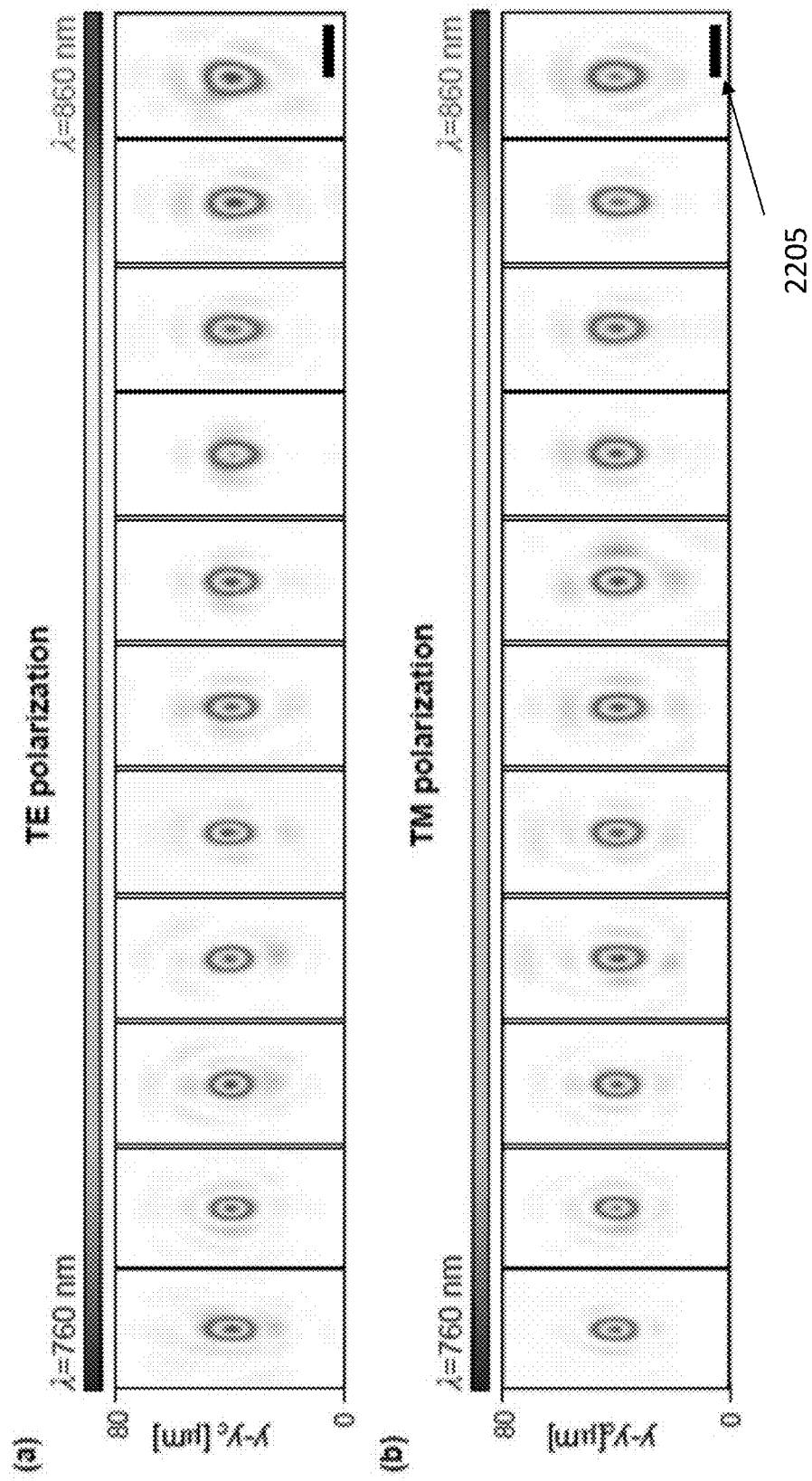
FIGS. 22-23 illustrate focal plane intensity profiles.
Figure 23:
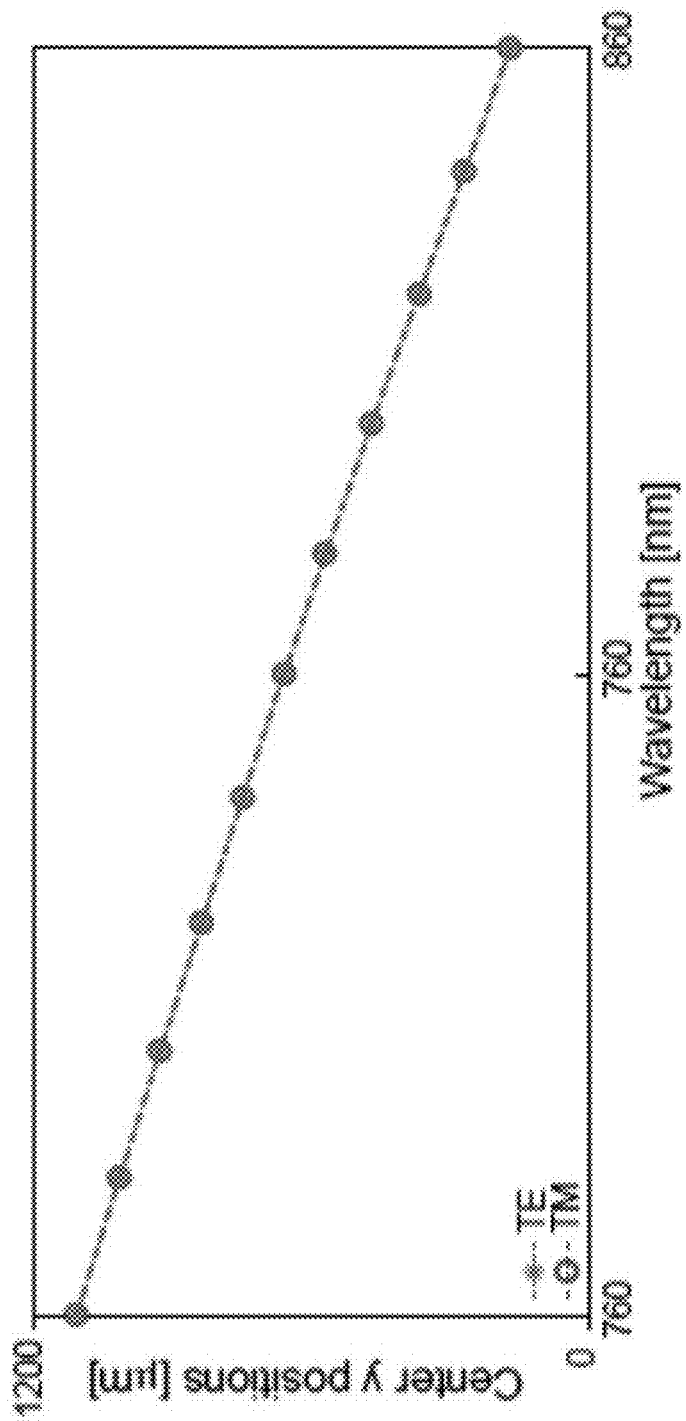

FIG. 22 panel a illustrates two-dimensional intensity profiles measured at several wavelengths ($y_c$ is the center position of each profile) under illumination with TE polarized light. FIG. 22 panel b illustrates intensity profiles with TM polarized light. FIG. 23 illustrates the corresponding position of the center of the focal spot along the dispersion direction, y, versus wavelength. The scale bars (2205) are 20 micrometers.

Figure 24:
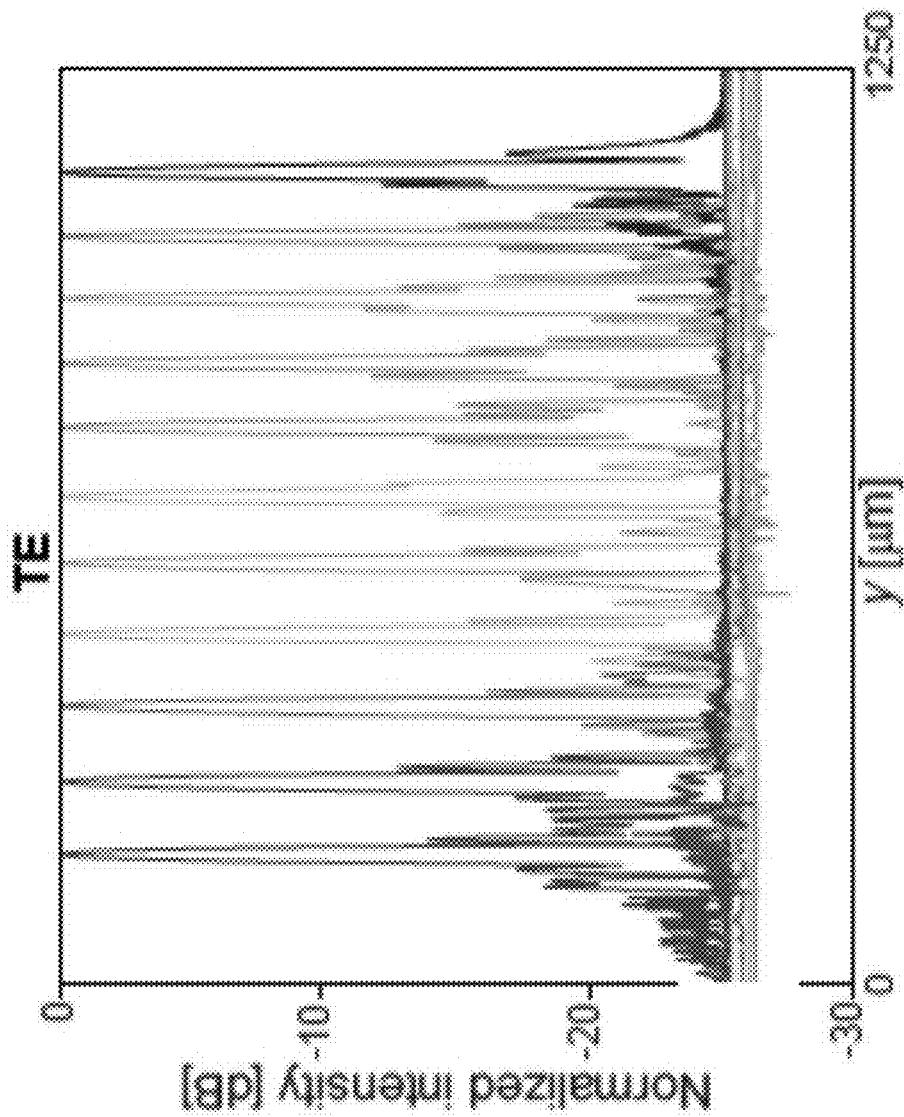
FIGS. 24-25 illustrate intensity distribution profiles on logarithmic scales.
Figure 25:
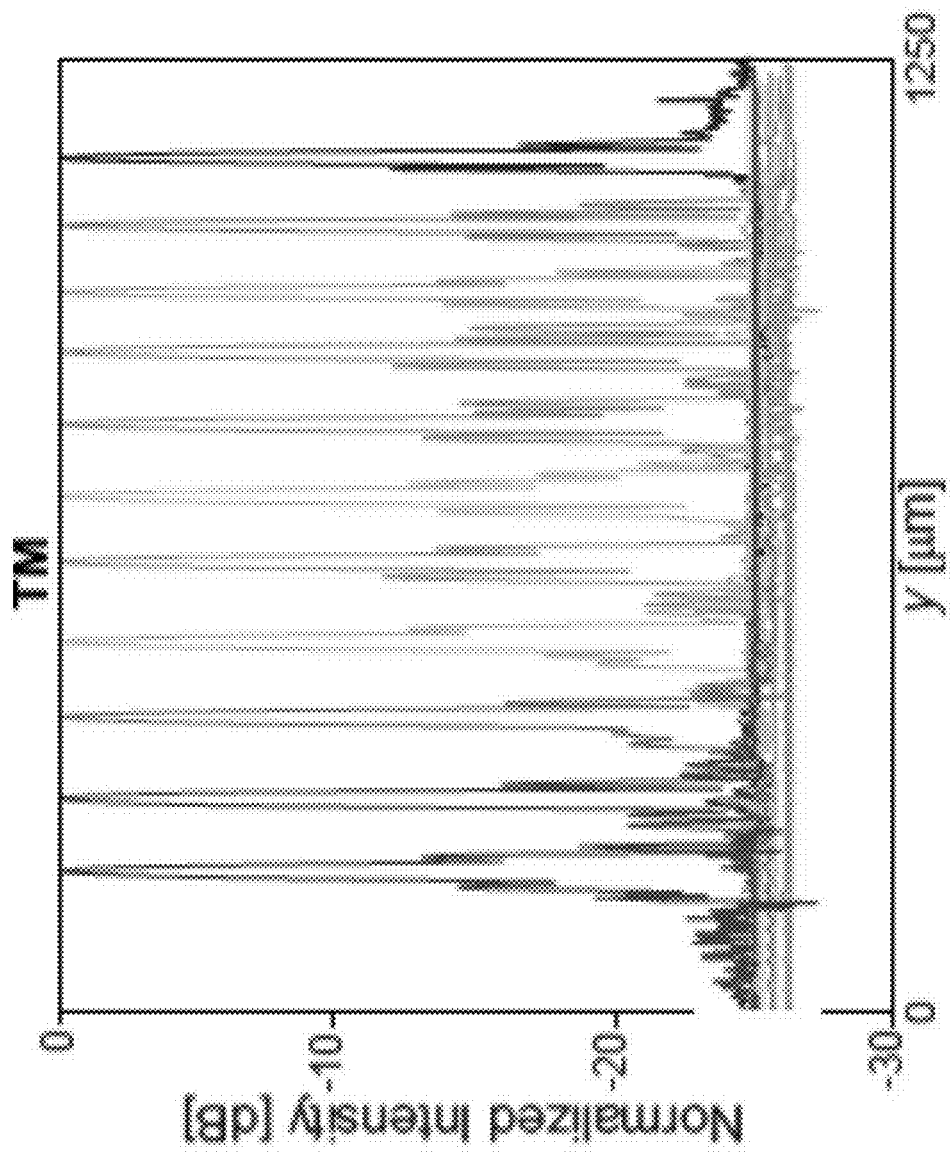
Figure 26:
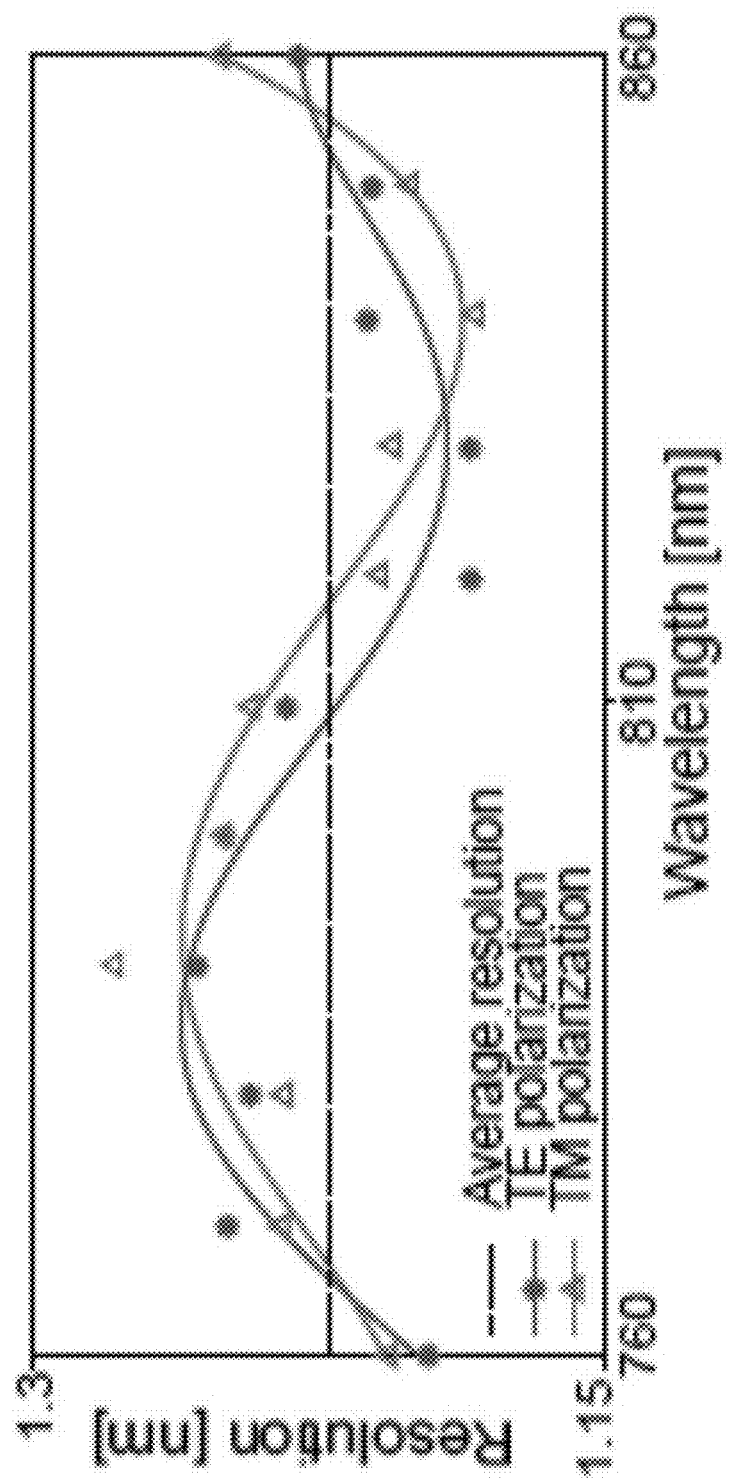
FIG. 26 illustrates the measured spectral resolution versus wavelength.
Figure 27:
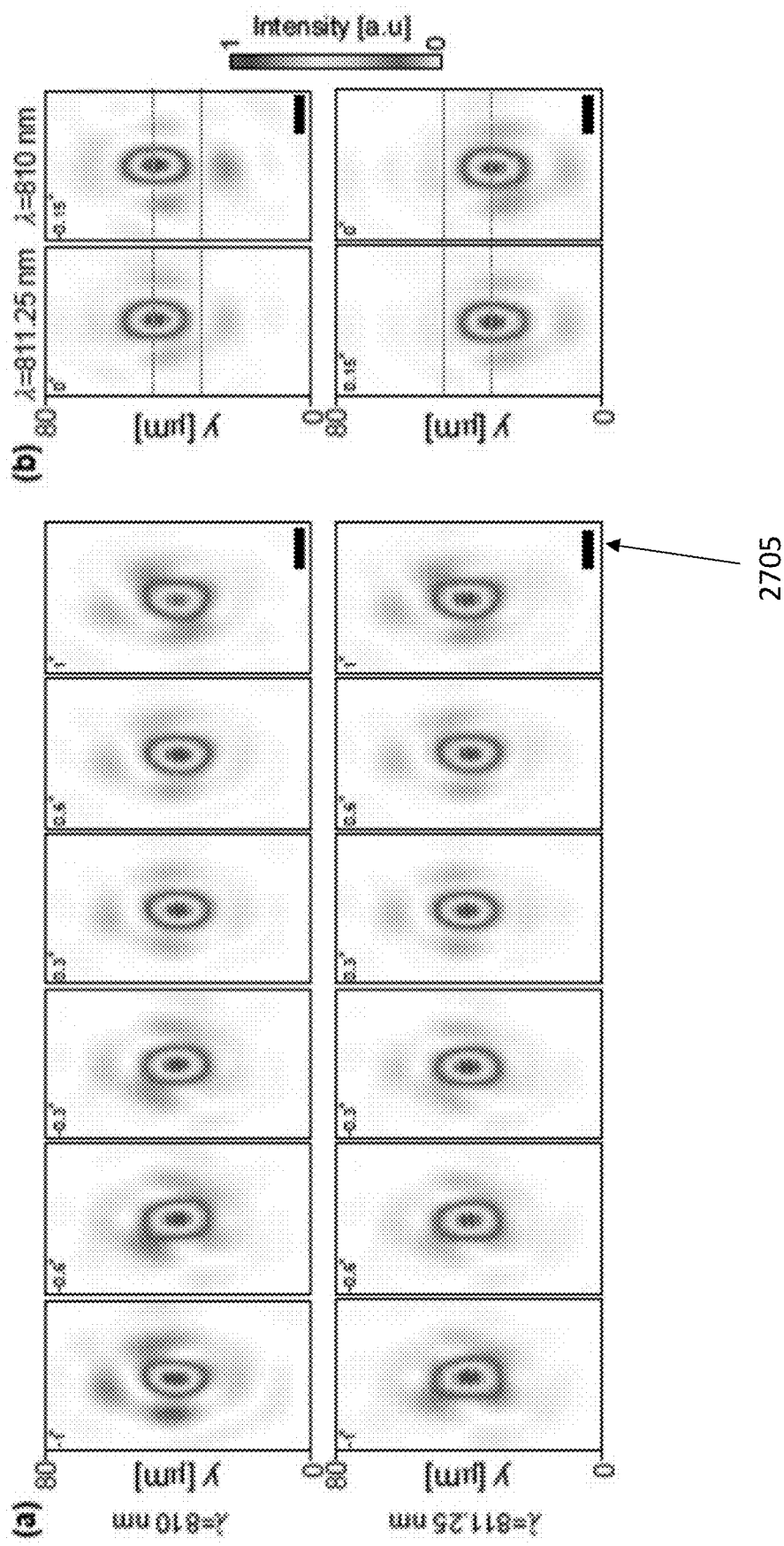
FIG. 27 illustrates the measured angular response of the device for polar angle variation with respect to a 0° angle in x-z and y-z planes.

FIGS. 24-25 illustrates the same data of FIG. 7, but plotted on a logarithmic scale for TE polarization, and for TM polarization. FIG. 26 illustrates the spectral resolution estimated using the measured focal spot FWHM and the displacement rate of the focal spot with changing the wavelength. The average resolution is 1.22 nm for both polarizations. FIG. 27 panel a illustrates the angular response of the device for different tilted incident angles between −1° to +1° in the x-z plane. FIG. 27 panel b illustrates the angular response of the device for ±0.15° tilted incident angles in the y-z plane. The scale bars (2705) are 10 micrometers.

Figure 28:
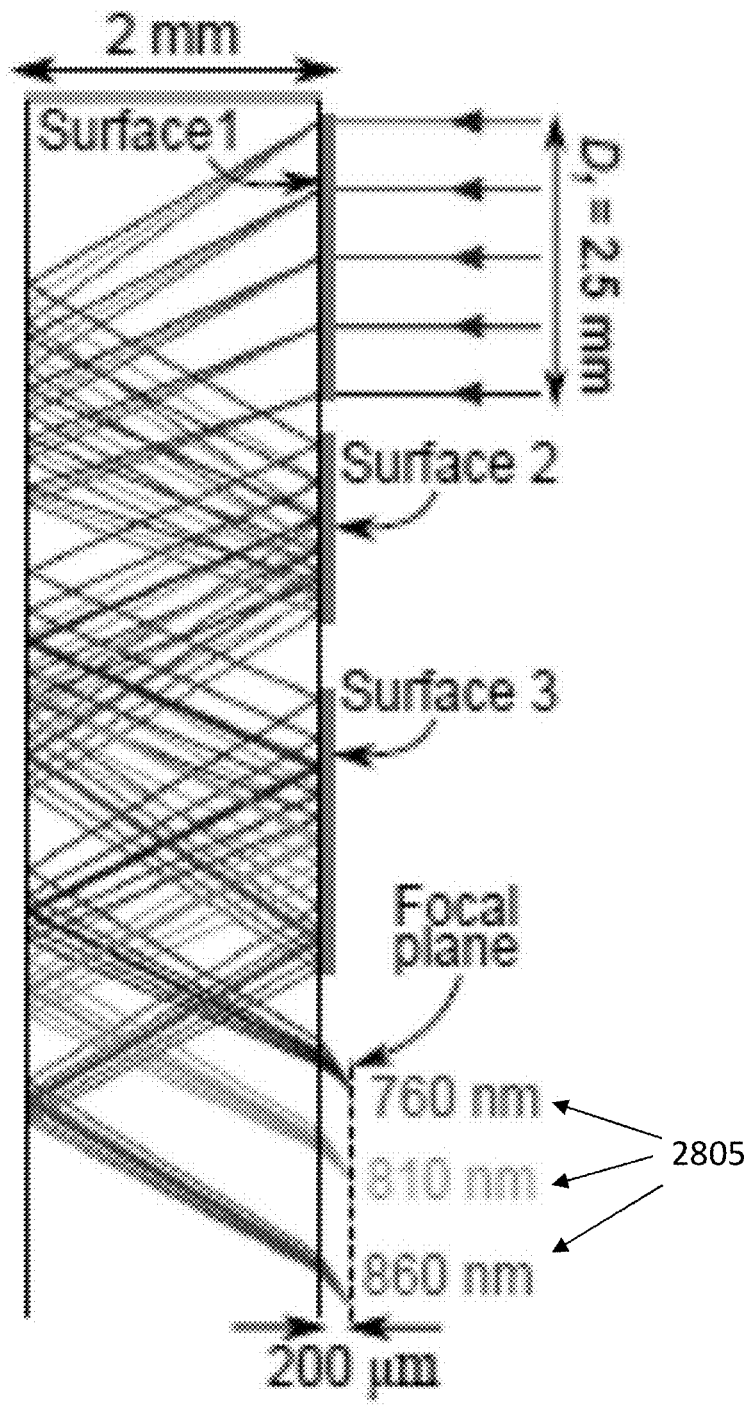
FIGS. 28-29 illustrate ray-optics design and simulation results of an extended-throughput folded spectrometer.
Figure 29:
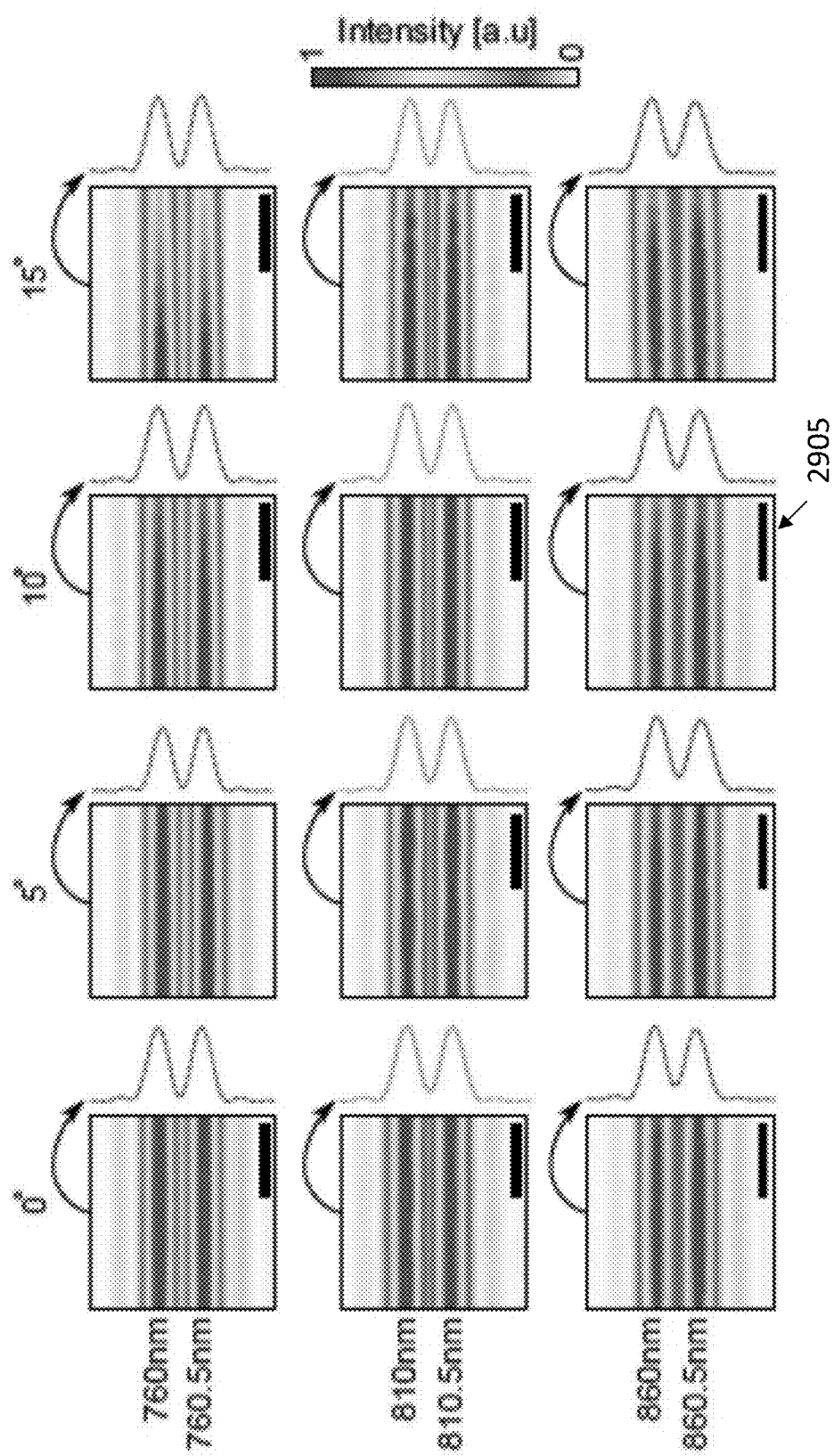

FIG. 28 illustrates ray tracing simulation results of the extended-throughput folded spectrometer, shown at three wavelengths (2805) in the center and two ends of the band. The system consists of three metasurfaces optimized to separate different wavelengths of the light and focus them on the focal plane. FIG. 29 illustrates a simulated intensity distribution for two wavelengths separated by 0.5 nm around three different center wavelengths of 760 nm, 810 nm, and 860 nm for 4 different incident angles of 0°, 5°, 10° and 15°. The intensity distributions show that wavelengths separated by 0.5 nm are theoretically resolvable for all aforementioned incident angles. The scale bars (2905) are 15 micrometers. In some embodiments, the image plane is designed to be exactly parallel (without any tilt) to the surface of the metasurfaces and the device, as visible in FIG. 28, for example. This provides many advantages for system alignment. In some embodiments, the coupling into the dielectric medium between the reflective surfaces to enable the light propagation is done by the first metasurface which is also a diffraction grating.

In some embodiments, the diffraction efficiency of a metasurface decreases further from the center (i.e., design) wavelength, because the reflection phase of the scatterers is a function of the wavelength. Therefore, the optimal value for the phase corresponds to the center wavelength. The phases will deviate from the optimal value at wavelengths other than the design value. However, this can be avoided if the reflection phases of all the scatterers used in a metasurface change equally when the wavelength is varied. For example, if all phases change $0.1\pi$ from their respective values at 810 nm, when the wavelength is varied to 790 nm. In practice, it can be difficult to keep the phase change equal across a varying wavelength. The present disclosure describes a method, with reference to FIGS. 14-18, to mitigate this issue as much as possible. The method is based on finding the nano-post height and lattice constant which minimize the variations in the derivative of the phase with respect to wavelength, for different post sizes. The change in the phase versus wavelength is dominated by this derivative. As a result, the change in the phases of different posts will be very close to each other if they all have similar phase vs wavelength derivatives. This is verified in FIGS. 17-18, where the phase changes very slightly when the wavelength is changed.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A structure comprising:
   two reflective surfaces opposite to each other and configured to reflect electromagnetic waves;
   a dielectric medium between the two reflective surfaces, the dielectric medium being transparent to the reflected electromagnetic waves;
   at least one first opening on one of the two reflective surfaces and configured to input electromagnetic waves;
   at least one second opening on one of the two reflective surfaces and configured to output the reflected electromagnetic waves; and
   a plurality of metasurfaces between the two reflective surfaces,
   wherein:
   each metasurface of the plurality of metasurfaces comprises an array of scatterers,
   each metasurface of the plurality of metasurfaces is configured to control a phase or a polarization of the reflected electromagnetic waves, and
   lateral dimensions of each scatterer of the array of scatterers are configured so that the phase of the reflected electromagnetic waves is polarization independent.

2. The structure of claim 1, wherein the array of scatters is made of silicon and the two reflective surfaces are made of gold.

3. The structure of claim 1, wherein the structure is a spectrometer, and the plurality of metasurfaces are configured to separate the input electromagnetic radiation into separate wavelengths.

4. The structure of claim 1, wherein an image plane for output electromagnetic waves is parallel to the two reflective surfaces and to the plurality of metasurfaces.

5. A method comprising:
   calculating a phase profile for each metasurface of a plurality of metasurfaces, each metasurface of the plurality of metasurfaces comprising an array of scatterers;
   calculating lateral dimensions of each array of scatterers for each metasurface of the plurality of metasurfaces based on the phase profile of the corresponding metasurface of the plurality of metasurfaces; and
   fabricating a structure comprising:
      two reflective surfaces opposite to each other and configured to reflect electromagnetic waves;
      a dielectric medium between the two reflective surfaces, the dielectric medium being transparent to the reflected electromagnetic waves;
      at least one first opening on one of the two reflective surfaces and configured to input electromagnetic waves;
      at least one second opening on one of the two reflective surfaces and configured to output the reflected electromagnetic waves;
      the plurality of metasurfaces between the two reflective surfaces, and
      the phase profile is polarization independent.

6. The method of claim 5, wherein the structure is a spectrometer and the phase profile of the plurality of metasurfaces is configured to separate the input electromagnetic radiation into separate wavelengths.

7. The method of claim 5, wherein the array of scatters is made of silicon and the two reflective surfaces are made of gold.

8. The method of claim 5, wherein an image plane for output electromagnetic waves is parallel to the two reflective surfaces and to the plurality of metasurfaces.

9. The method of claim 5, further comprising calculating a derivative of a phase of the reflected electromagnetic waves with respect to a wavelength of the reflected electromagnetic waves, and wherein calculating a phase profile and calculating lateral dimensions are carried out to obtain a constant derivative of the phase of the reflected electromagnetic waves with respect to the wavelength of the reflected electromagnetic waves.

10. A structure comprising:
   two reflective surfaces opposite to each other and configured to reflect electromagnetic waves;
   a dielectric medium between the two reflective surfaces, the dielectric medium being transparent to the reflected electromagnetic waves;
   at least one first opening on one of the two reflective surfaces and configured to input electromagnetic waves;
   at least one second opening on one of the two reflective surfaces and configured to output the reflected electromagnetic waves; and
   a plurality of metasurfaces between the two reflective surfaces,
   wherein:
   each metasurface of the plurality of metasurfaces comprises an array of scatterers;
   each metasurface of the plurality of metasurfaces is configured to control a phase or a polarization of the reflected electromagnetic waves, and
   lateral dimensions of each scatterer of the array of scatterers are configured so that a derivative of the phase of the reflected electromagnetic waves with respect to a wavelength of the reflected electromagnetic waves is constant.

11. A method comprising:
   calculating a phase profile for each metasurface of a plurality of metasurfaces, each metasurface of the plurality of metasurfaces comprising an array of scatterers;
   calculating lateral dimensions of each array of scatterers for each metasurface of the plurality of metasurfaces based on the phase profile of the corresponding metasurface of the plurality of metasurfaces; and
   fabricating a structure comprising:
      two reflective surfaces opposite to each other and configured to reflect electromagnetic waves;
      a dielectric medium between the two reflective surfaces, the dielectric medium being transparent to the reflected electromagnetic waves;
      at least one first opening on one of the two reflective surfaces and configured to input electromagnetic waves;
      at least one second opening on one of the two reflective surfaces and configured to output the reflected electromagnetic waves; and
      the plurality of metasurfaces between the two reflective surfaces, the method further comprising
   calculating a derivative of a phase of the reflected electromagnetic waves with respect to a wavelength of the reflected electromagnetic waves, and wherein calculating a phase profile and calculating lateral dimensions are carried out to obtain a constant derivative of the phase of the reflected electromagnetic waves with respect to the wavelength of the reflected electromagnetic waves.

* * * * *